(12) United States Patent
Yoon

(10) Patent No.: US 12,554,960 B2
(45) Date of Patent: Feb. 17, 2026

(54) METAL CARD HAVING A GLASS BODY AND A METHOD FOR MANUFACTURING THE SAME

(71) Applicant: BIOSMART CORPORATION, Seoul (KR)

(72) Inventor: Tae Ki Yoon, Cheonan-si (KR)

(73) Assignee: BIOSMART CORPORATION, Seoul (KR)

( * ) Notice: Subject to any disclaimer, the term of this patent is extended or adjusted under 35 U.S.C. 154(b) by 0 days.

(21) Appl. No.: 19/228,726

(22) Filed: Jun. 4, 2025

(65) Prior Publication Data
US 2025/0299012 A1  Sep. 25, 2025

Related U.S. Application Data

(63) Continuation-in-part of application No. PCT/KR2023/003645, filed on Mar. 20, 2023.

(30) Foreign Application Priority Data

Dec. 15, 2022  (KR) .................. 10-2022-0175718
Jan. 3, 2023    (KR) .................. 10-2023-0000845

(51) Int. Cl.
*G06K 19/07*  (2006.01)
*G06K 19/077* (2006.01)

(52) U.S. Cl.
CPC . *G06K 19/07722* (2013.01); *G06K 19/07728* (2013.01); *G06K 19/07747* (2013.01); *G06K 19/0775* (2013.01); *G06K 19/07773* (2013.01)

(58) Field of Classification Search
CPC ....... G06K 19/07722; G06K 19/07728; G06K 19/07747; G06K 19/0775; G06K 19/07773

(Continued)

(56) References Cited

U.S. PATENT DOCUMENTS 11,361,204 B2 * 6/2022 Cox ................. G06K 19/07749
11,755,873 B1 * 9/2023 Finn ................. G06K 19/07749
                                                             235/492

(Continued)

FOREIGN PATENT DOCUMENTS

KR      20120100476 A     9/2012
KR      20120120520 A     11/2012

(Continued)

OTHER PUBLICATIONS

International Search Report—PCT/KR2023/003645 dated Sep. 12, 2023.

*Primary Examiner* — Daniel A Hess
(74) *Attorney, Agent, or Firm* — CANTOR COLBURN LLP

(57) ABSTRACT

A metal card includes: a frame metal body formed of a metal plate having a card-sized shape and thickness, the frame metal body including a first insertion space on an upper surface, a second insertion space on a lower surface, and a first chip insertion hole; a glass body formed of a sheet made of glass material and inserted into the first insertion space; a 3D pattern printed layer comprising a printed layer, a UV 3D pattern layer, a deposition layer formed of multiple layers, and a light-blocking printed layer, the 3D pattern printed layer being disposed between the glass body and the frame metal body; a rear metal body formed of a metal sheet and inserted into the second insertion space; an antenna module mounted in an antenna insertion space of the rear metal body; and an IC module for a card.

14 Claims, 25 Drawing Sheets

(58) Field of Classification Search
USPC .......................................................... 235/488
See application file for complete search history.

(56) References Cited

U.S. PATENT DOCUMENTS

| | | |
|---|---|---|
| 2010/0193590 A1 | 8/2010 | Komatsu et al. |
| 2022/0138522 A1* | 5/2022 | Lotya ..................... H05K 1/165 |
| | | 235/492 |
| 2024/0249104 A1* | 7/2024 | Finn ................. G06K 19/07773 |

FOREIGN PATENT DOCUMENTS

| | | |
|---|---|---|
| KR | 101414081 B1 | 7/2014 |
| KR | 102226904 B1 | 3/2021 |
| KR | 20210037897 A | 4/2021 |

* cited by examiner

METAL CARD HAVING A GLASS BODY AND A METHOD FOR MANUFACTURING THE SAME

TECHNICAL FIELD

The present invention relates to a metal card and a method for manufacturing the same, and more particularly, to a metal card having a glass three-dimensional pattern with excellent pattern relief on a surface of the card, and a method for manufacturing the same.

BACKGROUND ART

Credit cards are used for purposes such as identification, payment, and credit provision. Since credit cards are typically carried at all times by users, their shapes and designs have become increasingly elaborate to provide artistic value and serve as accessories. In addition, the shape and design of the credit card, along with its services such as discounts and point rewards, serve as important factors in a consumer's selection of a credit card. Accordingly, card manufacturers are striving to meet the diverse needs of customers by developing and offering cards that are not only aesthetically enhanced in shape and design, but also functionally distinct from conventional credit cards.

As one of such efforts, various attempts have been made to enhance the visual appeal of credit cards by providing a three-dimensional effect through the addition of three-dimensional patterns on the surface of the card.

Korean Laid-Open Patent Publication No. 10-2012-0120520, filed and published by the present applicant, discloses a "method for manufacturing a card having a special pattern". The disclosed patent proposes a technique in which a special pattern sheet having a three-dimensional pattern corresponding to a special pattern is produced using a patterned mold having a special three-dimensional design, and a plurality of sheets including the special pattern sheet are laminated and thermocompression bonded together. The disclosed technology is characterized in that fine patterns can be formed on the card using the special pattern sheet. However, when the special pattern sheet is formed on a plastic sheet such as PVC according to the aforementioned patent, the three-dimensional effect of the special pattern sheet is reduced due to the low transmittance of the plastic sheet.

Meanwhile, conventionally, credit cards have been primarily manufactured using plastic materials. However, in recent years, the shapes and designs of credit cards have been becoming increasingly elaborate. In line with this trend and the preferences and demands of consumers, the materials used for credit cards have also become more diverse. One such example is a metal card, which is a credit card manufactured using a metal material.

Credit cards made of metal provide a unique metallic luster, a desirable sense of weight, and a distinctive texture. Due to these perceived benefits, metal credit cards offer an enhanced user experience compared to conventional plastic cards. Accordingly, metal cards are increasingly being positioned as premium credit cards.

Accordingly, the present invention proposes a solution for providing a metal card capable of significantly enhancing the three-dimensional effect of a pattern formed on the surface of the card.

SUMMARY OF THE INVENTION

In order to solve the aforementioned problems, the present invention is directed to providing a metal card having a glass body with an excellent three-dimensional pattern, and a method for manufacturing the same.

To achieve the above-described technical objectives, a metal card having a glass body according to a first aspect of the present invention includes: a frame metal body formed of a metal plate having a card-sized shape and thickness, the frame metal body including a first insertion space on an upper surface and a second insertion space on a lower surface; a glass body formed of a sheet made of glass material and having a size configured to be insertable into the first insertion space of the frame metal body; a rear metal body formed of a metal sheet and having a size configured to be insertable into the second insertion space of the frame metal body, the rear metal body including an antenna insertion space; and an antenna module including an antenna on a surface of a substrate, the antenna module being mounted in the antenna insertion space of the rear metal body.

In the metal card having a glass body according to the first aspect described above, it is preferable that the card further includes a printed layer disposed between a rear surface of the glass body and an upper surface of the frame metal body, and a 3D pattern layer disposed between a rear surface of the printed layer and the upper surface of the frame metal body. More preferably, the 3D pattern layer includes: a UV 3D pattern layer formed by a three-dimensional pattern composed of a UV-curable material on a surface of the printed layer; a deposition layer having a multilayer structure, formed by sequentially depositing different materials on a surface of the pattern of the UV 3D pattern layer; and a light-blocking layer formed by applying a light-shielding material on a surface of the deposition layer to block light transmission.

In the metal card having a glass body according to the first aspect described above, it is preferable that the deposition layer is configured such that the types of deposition materials, the order of stacking the of deposition materials, and the thickness of each layer are determined according to the desired color tone or level of reflectivity required for the pattern of the metal card.

In the metal card having a glass body according to the first aspect described above, it is preferable that the card further includes a shatterproof film made of a transparent adhesive film and disposed on a rear surface of the glass body.

In the metal card having a glass body according to the first aspect described above, it is preferable that the card further includes an IC module for a card having contact points electrically connected to contact points of the antenna, and that the frame metal body includes a first chip insertion hole in its main body, the glass body includes a second chip insertion hole at a position corresponding to the first chip insertion hole, the rear metal body includes a third chip insertion hole at a position corresponding to the first chip insertion hole, and the IC module for a card is mounted in the first, second, and third chip insertion holes.

In the metal card having a glass body according to the first aspect described above, it is preferable that the frame metal body includes a first slit formed by cutting between an edge of the main body of the frame metal body and an edge of the first chip insertion hole, and that the rear metal body includes a second slit formed by cutting between an edge of the main body of the rear metal body and an edge of the third chip insertion hole.

According to a second aspect of the present invention, a method of manufacturing the metal card having a glass body comprises the steps of: (a) fabricating a glass body formed of a sheet made of glass material; (b) fabricating a frame metal body having a first insertion space on an upper surface and a second insertion space on a lower surface; (c) fabricating a rear metal body having an antenna insertion space; (d) fabricating an antenna module; and (e) assembling the glass body into the first insertion space of the frame metal body, assembling the antenna module and the rear metal body into the second insertion space, and laminating the assembled components.

In the method of manufacturing the metal card having a glass body according to the second aspect described above, it is preferable that the step (a) includes: (a1) processing a glass plate to fabricate a sheet made of glass material having a size configured to be insertable into the first insertion space of the frame metal body, and forming a second chip insertion hole in the glass sheet to complete the glass body; and (a2) forming a printed layer on a rear surface of the glass body.

In the method of manufacturing the metal card having a glass body according to the second aspect described above, it is preferable that the step (a) further includes: (a3) forming a UV 3D pattern layer by forming a three-dimensional pattern made of a UV-curable material on a surface of the printed layer; (a4) forming a deposition layer having a multilayer structure by sequentially depositing different materials on a surface of the pattern of the UV 3D pattern layer; and (a5) forming a light-blocking layer by applying a light-shielding material on a surface of the deposition layer to block light transmission.

In the method of manufacturing the metal card having a glass body according to the second aspect described above, it is preferable that the method further includes a step of applying a transparent adhesive material having a shatterproof function to a rear surface of the glass body to form a shatterproof film on the rear surface of the glass body.

In the method of manufacturing the metal card having a glass body according to the second aspect described above, it is preferable that the method further includes: (f) electrically connecting the antenna module and an IC module for a card in the laminated result and embedding the IC module by applying pressure, wherein the frame metal body includes a first chip insertion hole in its main body, the glass body includes a second chip insertion hole at a position corresponding to the first chip insertion hole, the rear metal body includes a third chip insertion hole at a position corresponding to the first chip insertion hole, and the IC module for a card is mounted in the first, second, and third chip insertion holes and embedded therein.

In the method of manufacturing the metal card having a glass body according to the second aspect described above, it is preferable that the step (b) further includes forming a first slit by cutting between an edge of the main body of the frame metal body and an edge of the first chip insertion hole, and that the step (c) further includes forming a second slit by cutting between an edge of the main body of the rear metal body and an edge of the third chip insertion hole.

According to the third aspect of the present invention, the metal card having a glass body comprises: a frame metal body formed of a metal plate having a predetermined size of a card, the frame metal body including a glass body insertion space on its front surface; a glass body formed of a sheet made of glass material and having a size configured to be insertable into the glass body insertion space of the frame metal body; an EMI absorption sheet disposed on a rear surface of the frame metal body; an antenna inlay sheet having an antenna mounted on its surface and disposed on a rear surface of the EMI absorption sheet; and a rear printed sheet made of a synthetic resin material and disposed on a rear surface of the antenna inlay sheet.

In the metal card according to the third aspect described above, it is preferable that the card further includes an IC module for a card having contact points electrically connected to contact points of the antenna. More preferably, the frame metal body includes a first chip insertion hole in its main body, the glass body includes a second chip insertion hole at a position corresponding to the first chip insertion hole, and the IC module for a card is mounted in the first and second chip insertion holes.

According to the fourth aspect of the present invention, the metal card having a glass body comprises: a frame metal body formed of a metal plate having a predetermined size of a card, the frame metal body having a glass body insertion space formed on its front surface; a glass body formed of a sheet made of glass material and having a size configured to be insertable into the glass body insertion space of the frame metal body; an antenna inlay sheet having an antenna mounted on its surface and disposed on a rear surface of the frame metal body; and a rear printed sheet made of a synthetic resin material and disposed on a rear surface of the antenna inlay sheet.

In the metal card having a glass body according to the fourth aspect of the present invention, it is preferable that the card further includes an IC module for a card having contact points electrically connected to contact points of the antenna. More preferably, the frame metal body includes a first chip insertion hole formed in a predetermined region of its main body, and a slit formed by cutting between an edge of the main body of the frame metal body and an edge of the first chip insertion hole. More preferably, the glass body includes a second chip insertion hole at a position corresponding to the first chip insertion hole, and the IC module for a card is mounted in the first and second chip insertion holes.

In the metal card having a glass body according to the third and fourth aspects described above, it is preferable that the card includes: a printed layer disposed between a rear surface of the glass body and an upper surface of the frame metal body; a UV 3D pattern layer formed by a three-dimensional pattern composed of a UV-curable material on a surface of the printed layer; a deposition layer having a multilayer structure formed by sequentially depositing different materials on a surface of the pattern of the UV 3D pattern layer; and a light-blocking layer formed by applying a light-shielding material on a surface of the deposition layer to block light transmission, so as to provide a three-dimensional pattern.

In the metal card having a glass body according to the third and fourth aspects described above, it is preferable that the deposition layer is configured such that the types of deposition materials, the stacking order, and the thickness of each layer are determined according to the required color tone or degree of reflectivity for the pattern of the metal card.

In the metal card having a glass body according to the third and fourth aspects described above, it is preferable that the card further includes a shatterproof film made of a transparent adhesive film and disposed on a rear surface of the glass body.

According to the fifth aspect of the present invention, the method of manufacturing the metal card having a glass body comprises the steps of: (a) fabricating a glass body formed of a sheet made of glass material; (b) fabricating a frame metal body having a glass body insertion space formed on an upper surface thereof; (c) fabricating an EMI absorption sheet; (d) fabricating an antenna inlay sheet; and (e) assembling the glass body into the glass body insertion space of the frame metal body, sequentially stacking the EMI absorption sheet, the antenna inlay sheet, a rear printed sheet, and a rear protective sheet on a rear surface of the frame metal body, and laminating the assembled structure.

In the method of manufacturing the metal card having a glass body according to the fifth aspect described above, it is preferable that the method further includes: (f) electrically connecting the antenna contact of the antenna inlay sheet and an IC module for a card in the laminated result, and embedding the IC module by applying pressure. In addition, the step (b) preferably further includes forming a first chip insertion hole in the main body of the frame metal body; the step (a) preferably further includes forming a second chip insertion hole in the glass body at a position corresponding to the first chip insertion hole; and the IC module for a card is preferably mounted in the first and second chip insertion holes and embedded therein.

According to the sixth aspect of the present invention, the method of manufacturing the metal card having a glass body comprises the steps of: (a) fabricating a glass body formed of a sheet made of glass material; (b) fabricating a frame metal body having a glass body insertion space on an upper surface thereof; (c) fabricating an antenna inlay sheet; and (d) assembling the glass body into the glass body insertion space of the frame metal body, sequentially stacking the antenna inlay sheet, a rear printed sheet, and a rear protective sheet on a rear surface of the frame metal body, and laminating the assembled structure.

In the method of manufacturing the metal card having a glass body according to the sixth aspect described above, it is preferable that the method further includes: (e) electrically connecting the antenna contact of the antenna inlay sheet and an IC module for a card in the laminated result, and embedding the IC module by applying pressure. More preferably, the step (b) further includes forming a first chip insertion hole in the main body of the frame metal body, and forming a slit by cutting between an edge of the main body of the frame metal body and an edge of the first chip insertion hole. In addition, more preferably, the step (a) further includes forming a second chip insertion hole in the glass body at a position corresponding to the first chip insertion hole, and the IC module for a card is mounted in the first and second chip insertion holes and embedded therein.

In the method of manufacturing the metal card having a glass body according to the fifth and sixth aspects described above, it is preferable that the step (a) includes: (a1) processing a glass plate to fabricate a glass sheet made of glass material having a size configured to be insertable into the glass body insertion space of the frame metal body, and forming a second chip insertion hole in the glass sheet to complete the glass body; (a2) forming a printed layer on a rear surface of the glass body; (a3) forming a UV 3D pattern layer by forming a three-dimensional pattern made of a UV-curable material on a surface of the printed layer; (a4) forming a deposition layer having a multilayer structure by sequentially depositing different materials on a surface of the pattern of the UV 3D pattern layer; and (a5) forming a light-blocking layer by applying a light-shielding material on a surface of the deposition layer to block light transmission.

In the method of manufacturing the metal card having a glass body according to the fifth and sixth aspects described above, it is preferable that the method further includes a step of applying a transparent adhesive material having a shatterproof function to a rear surface of the glass body to form a shatterproof film on the rear surface of the glass body.

The metal card according to the present invention can implement a new type of metal card by including a glass body on the surface of the card. In addition, the metal card according to the present invention includes a printed layer on a rear surface of the glass body, the printed layer having a multilayer film with a three-dimensional pattern, thereby further enhancing the three-dimensional appearance of the pattern as seen through the glass body. Accordingly, the present invention can provide a more luxurious metal card with an enhanced three-dimensional effect.

DETAILED DESCRIPTION

First Embodiment

Figure 1A:
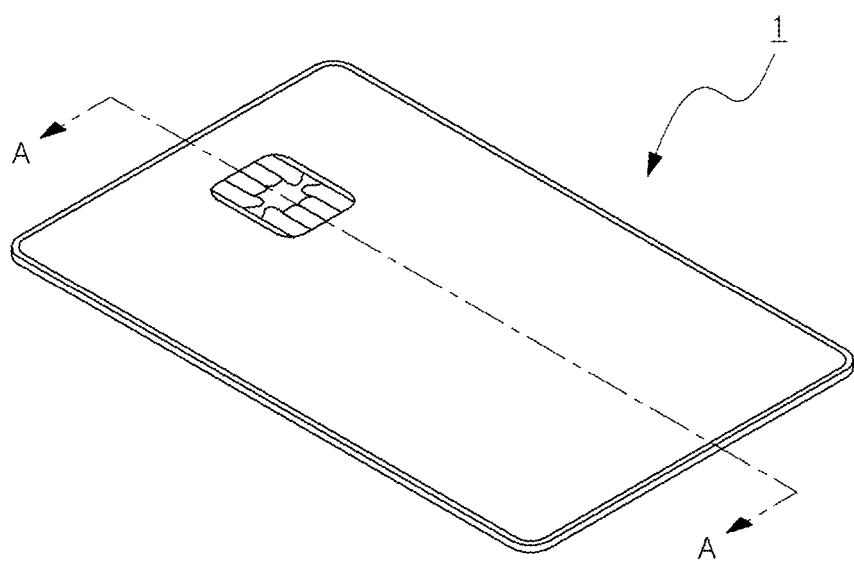
FIGS. 1A and 1B are a perspective view and a cross-sectional view, respectively, of a metal card having a glass body according to the preferred first embodiment of the present invention.
Figure 1B:
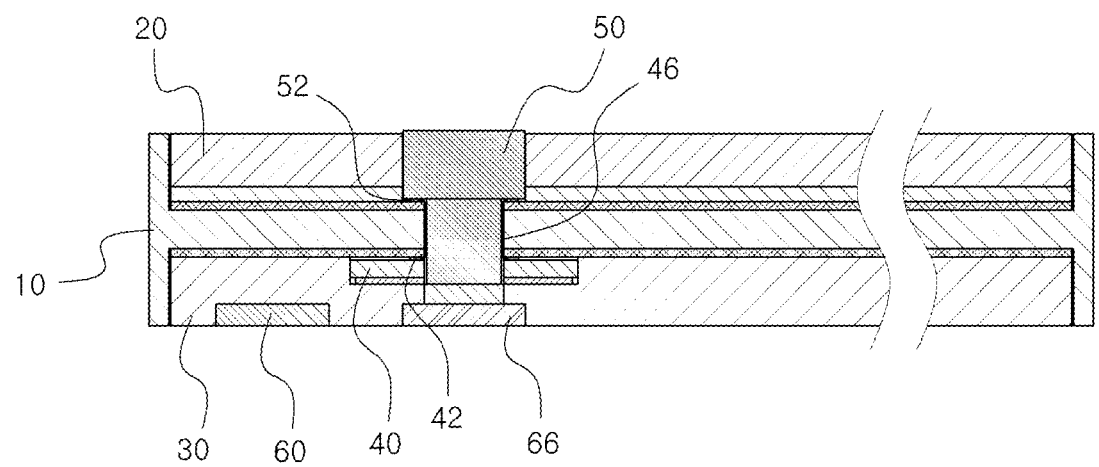

Hereinafter, a metal card having a glass body according to the preferred first embodiment of the present invention will be described in detail with reference to the accompanying drawings. FIGS. 1A and 1B are a perspective view and a cross-sectional view, respectively, of a metal card having a glass body according to the preferred first embodiment of the present invention, and FIG. 2 is an exploded cross-sectional view taken along line A-A' of FIG. 1A.

Figure 2:
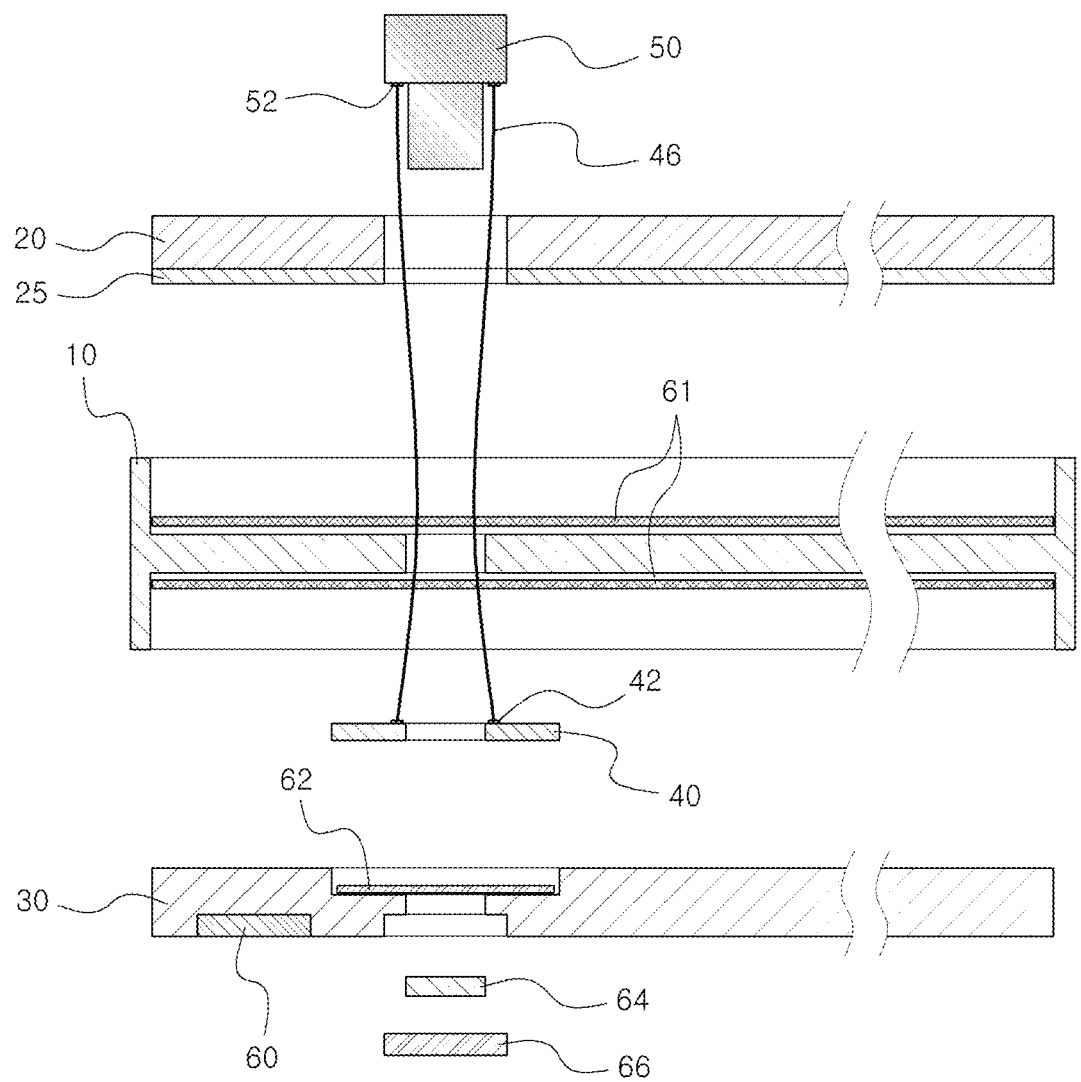
FIG. 2 is an exploded cross-sectional view taken along line A-A' of FIG. 1A.

Referring to FIGS. 1 and 2, a metal card 1 according to the present invention includes a frame metal body 10, a glass body 20, a rear metal body 30, an antenna module 40, a 3D pattern printed layer 25, and an IC module for a card 50.

The main body of the frame metal body 10 is made of a metal having a predetermined size and thickness of a card. The main body of the frame metal body includes a first insertion space on an upper surface thereof for inserting the glass body, and a second insertion space on a lower surface thereof for inserting the rear metal body. The main body of the frame metal body further includes a first chip insertion hole and a first slit. The first slit is formed by cutting between an edge of the main body of the frame metal body and an edge of the first chip insertion hole.

The glass body 20 is formed of a sheet made of a glass material having a size configured to be insertable into the first insertion space of the frame metal body, and includes a second chip insertion hole at a position corresponding to the first chip insertion hole.

The 3D pattern printed layer 25 is provided between the rear surface of the glass body and the upper surface of the frame metal body. The 3D pattern printed layer 25 may be composed of only a printed layer 26, or may be composed of the printed layer 26, a UV 3D pattern layer 27, a deposition layer 28, and a light-blocking layer 29. The 3D pattern printed layer can provide an excellent three-dimensional effect through the surface of the glass body.

The printed layer 26 may be formed by printing a background color, logo, or pattern on one surface of the glass body, or may be formed by printing on a surface of an inlay sheet made of PVC material. The printed layer 26 may also be formed by digital printing. The UV 3D pattern layer 27 may be configured by forming a three-dimensional pattern made of a UV-curable material on the surface of the printed layer.

The deposition layer 28 may be formed as a multilayer film by sequentially depositing different materials on the surface of the pattern of the UV 3D pattern layer. The deposition layer formed as a multilayer film is intended to enhance the pattern expression of the pattern formed on the UV 3D pattern layer. The color tone or reflectivity of the pattern implemented by the deposition layer is determined by the types of materials deposited, the order of stacking, and the thickness of each layer.

The deposition material constituting the deposition layer may comprise one or more of oxides and inorganic metals, and the color of the pattern may be implemented according to the type of the deposition material. For example, the deposition layer that allows the pattern to appear transparent may be formed by sequentially stacking $TiO_2$, $SiO_2$, and $TiO_2$, and the transparency and reflectivity of the pattern may be determined by the thickness of the $SiO_2$ layer. The deposition layer that allows the pattern to appear silver in color may be formed by sequentially stacking $SiO_2$, $Al_2O_3$, indium, and $Al_2O_3$, and the silver color may be determined by the thickness of the indium layer. In addition, the deposition layer that allows the pattern to appear gold in color may be formed by sequentially stacking $TiO_2$, $Al_2O_3$, indium, and $Al_2O_3$, and the gold color may be determined by the thickness of the $TiO_2$ layer.

As such, it is desirable to design the material structure and the thickness of each layer of the multilayers forming the deposition layer according to the color and reflectivity to be implemented in the pattern. The light-blocking layer 29 is formed by applying a light-shielding material onto the surface of the deposition layer to block light transmission.

Meanwhile, the metal card may further include a shatterproof film 24 between the glass body and the 3D pattern printed layer. By using a transparent adhesive film as the shatterproof film 24, the adhesion of the underlying printed layer can be improved. The shatterproof film not only serves as an adhesive between the glass body and the 3D pattern printed layer, but also prevents cracks from occurring in the glass body and prevents shattered fragments from scattering when the glass body breaks.

The main body of the rear metal body 30 is formed of a metal sheet having a size capable of being inserted into the second insertion space of the frame metal body. The rear metal body includes a third chip insertion hole and an antenna insertion space at positions corresponding to the first chip insertion hole. The antenna insertion space may be formed along the periphery of the third chip insertion hole. The rear metal body may further include a second slit formed by cutting between an edge of the main body of the rear metal body and an edge of the third chip insertion hole. A magnetic stripe (MS) insertion space may further be provided on the rear surface of the rear metal body 30. A magnetic stripe may be mounted in the MS insertion space.

The antenna module 40 may be formed as an insert-type antenna layer and be mounted in the antenna insertion space. The antenna module 40 may be formed by patterning an antenna wiring connected to the IC module for a card on the surface of a substrate or by mounting an antenna coil thereon. The antenna coil may be wound multiple turns on the surface of the substrate of the antenna module. Both ends of the IC module for a card may be electrically connected to the antenna wiring or the antenna coil.

The IC module for a card 50 is mounted in the first and second insertion holes, with its contacts electrically connected to the contacts of the antenna module. The IC module 50 is a COB (Chip On Board) type IC device, and is stably mounted across the glass body, the frame metal body, the antenna module, and the rear metal body. The IC module 50 is a device that operates according to a pre-set program by communicating with an external card reader via RF communication or direct contact.

The IC module for a card 50 may include a combi chip or a dual interface integrated chip that provides both a contactless interface function, which enables RF communication with a nearby external card reader through the antenna coil of the antenna module, and a contact interface function, which enables communication by direct contact with terminals of the external card reader.

Hereinafter, a method for manufacturing a metal card having a glass body according to the first embodiment of the present invention will be described in detail. In the manufacturing method of the metal card according to the first embodiment of the present invention, a glass body 20 having a 3D pattern printed layer 25 formed on one surface, a frame metal body 10, a rear metal body 30, and an antenna module 40 are first individually fabricated. Then, the fabricated components are assembled and laminated. Subsequently, the IC module for a card 50 is connected to the contact points of the antenna module, and the chip embedding process is completed by applying heat and pressure. The following describes each fabrication process in detail.

Figure 3A:
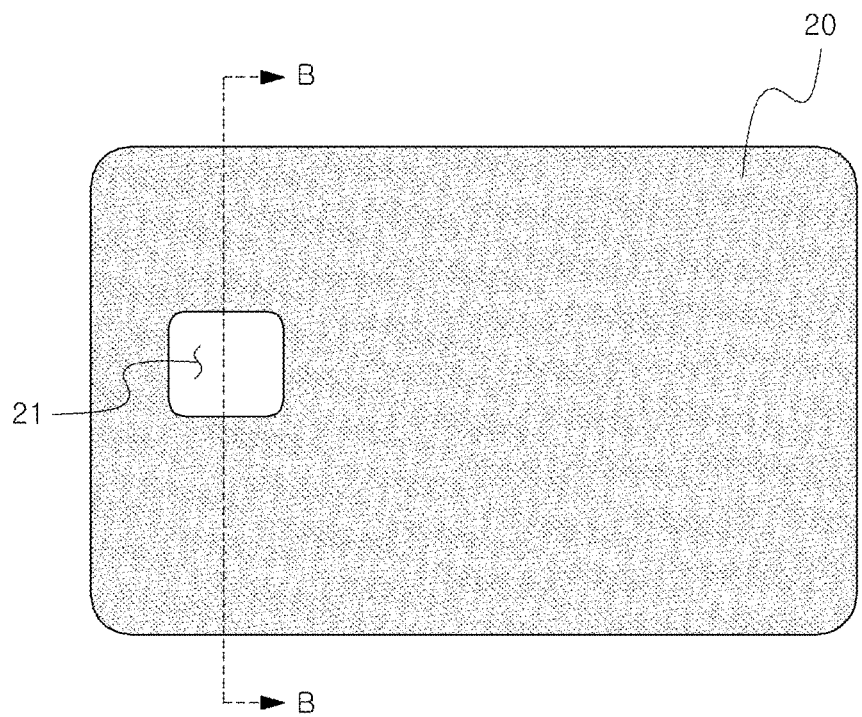
FIGS. 3A and 3B are a plan view and a cross-sectional view taken along line B-B', respectively, showing the glass body and the three-dimensional pattern layer of the metal card having a glass body according to the preferred first embodiment of the present invention.
Figure 3B:
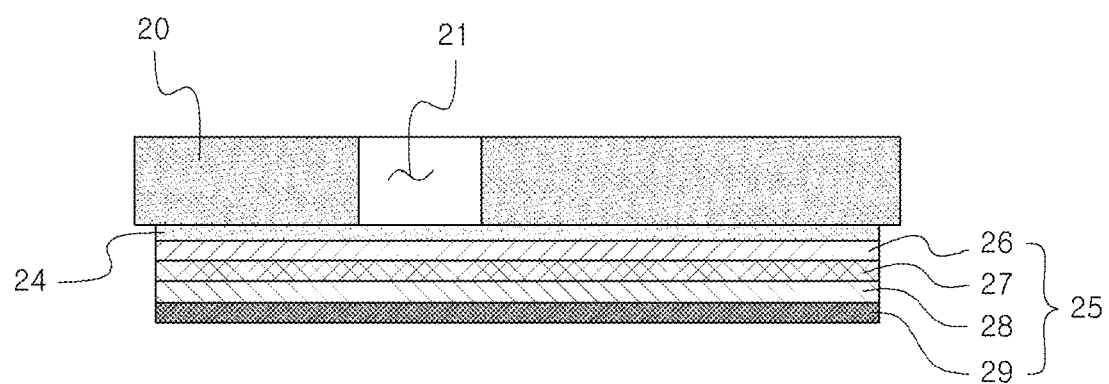

First, with reference to FIG. 3, a process for fabricating the glass body 20 and the 3D pattern printed layer 25 will be described. FIGS. 3A and 3B are a plan view and a cross-sectional view taken along the line B-B', respectively, showing the glass body 20 and the 3D pattern printed layer 25 in the metal card having the glass body according to the preferred first embodiment of the present invention.

Referring to FIG. 3, the glass body 20 is fabricated by processing a glass sheet into a predetermined shape and forming a second chip insertion hole 21, into which the IC module for a card will be mounted. Then, a printed layer 26, a UV pattern layer 27, a deposition layer 28, and a light-blocking layer 29 are sequentially formed on the rear surface of the glass body, thereby completing the fabrication of the 3D pattern printed layer 25.

At this time, before forming the 3D pattern printed layer 25, a shatterproof film 24 may additionally be applied to the rear surface of the glass body 20. The shatterproof film 24 not only serves as an adhesive between the glass body and the 3D pattern printed layer, but also prevents cracks from occurring in the glass and prevents fragments from scattering even if the glass breaks.

Figure 4A:
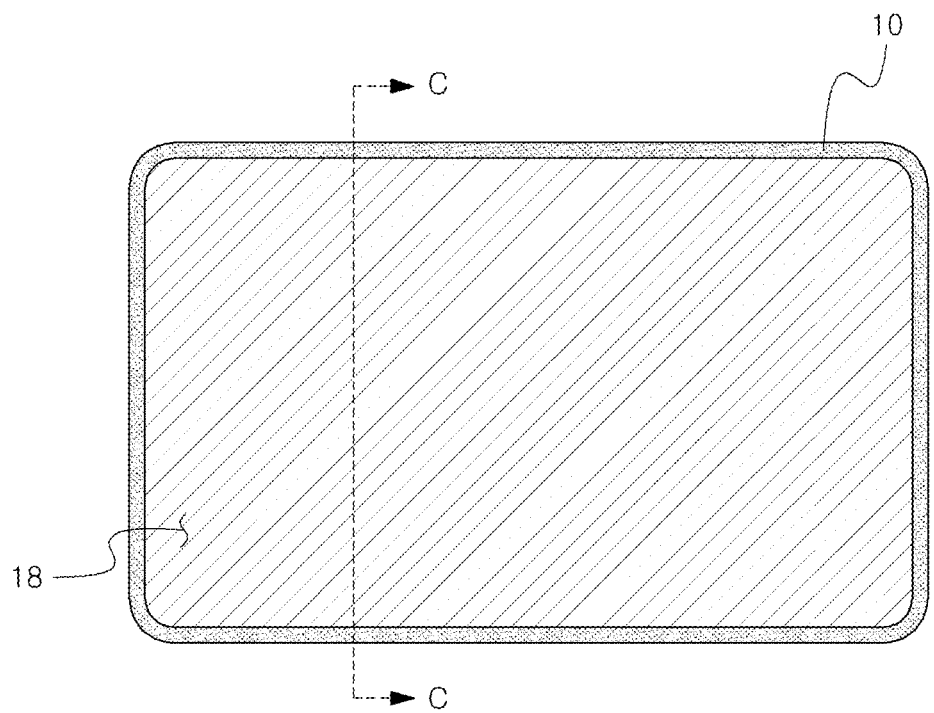
FIGS. 4A and 4B are a plan view and a cross-sectional view taken along line C-C', respectively, showing a state in which a first insertion space is formed in a main body of a frame metal body in the metal card having a glass body according to the preferred first embodiment of the present invention.
Figure 4B:
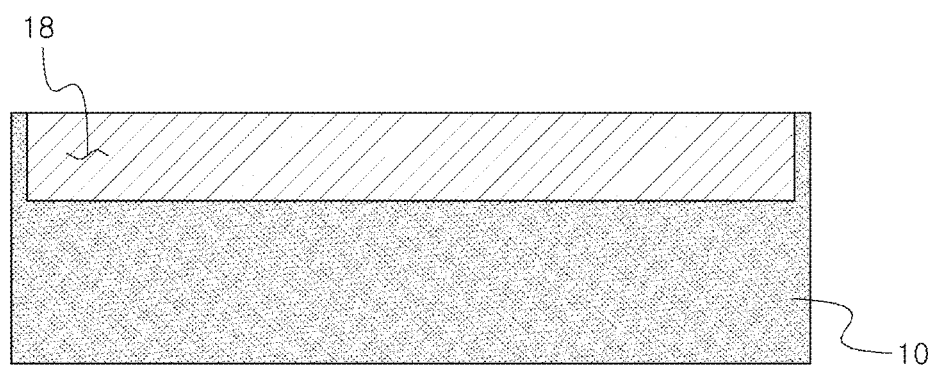

Next, with reference to FIGS. 4 to 6, a process for fabricating the frame metal body 10 will be described. FIGS. 4A and 4B are a plan view and a cross-sectional view taken along the line C-C', respectively, showing a state in which a first insertion space 18 is formed in the main body of the frame metal body in the metal card having a glass body according to the preferred first embodiment of the present invention. Referring to FIG. 4, the main body of the frame metal body is fabricated by numerically controlled (NC) machining a metal sheet to conform to the frame size. Then, the front surface of the main body of the frame metal body is milled to form the first insertion space 18 for inserting the glass body.

Figure 5A:
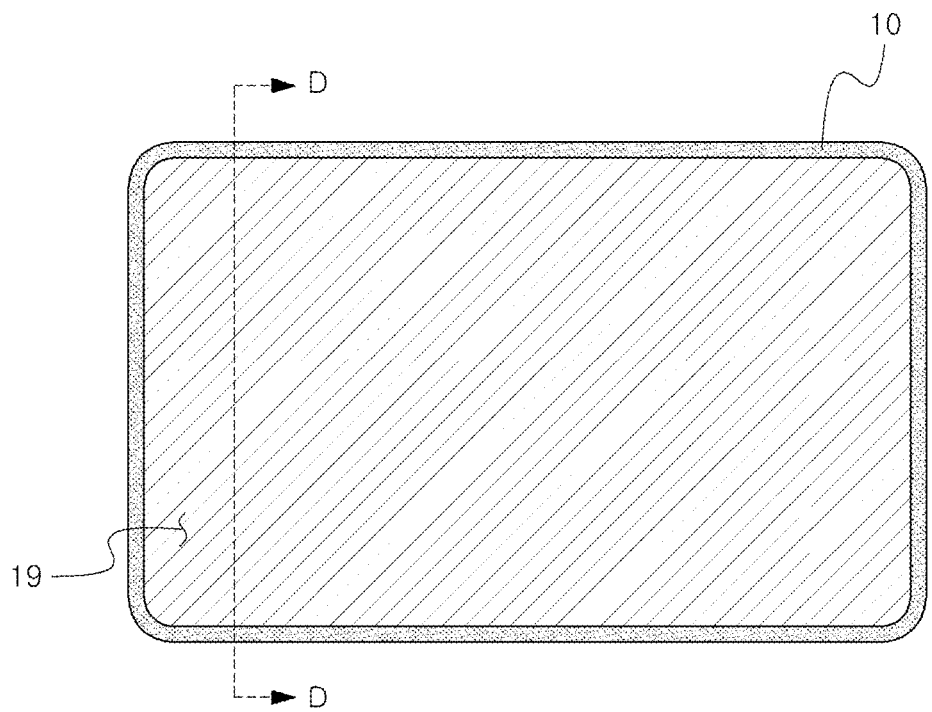
FIGS. 5A and 5B are a plan view and a cross-sectional view taken along line D-D', respectively, showing a state in which first and second insertion spaces are formed in the main body of the frame metal body in the metal card having a glass body according to the preferred first embodiment of the present invention.
Figure 5B:
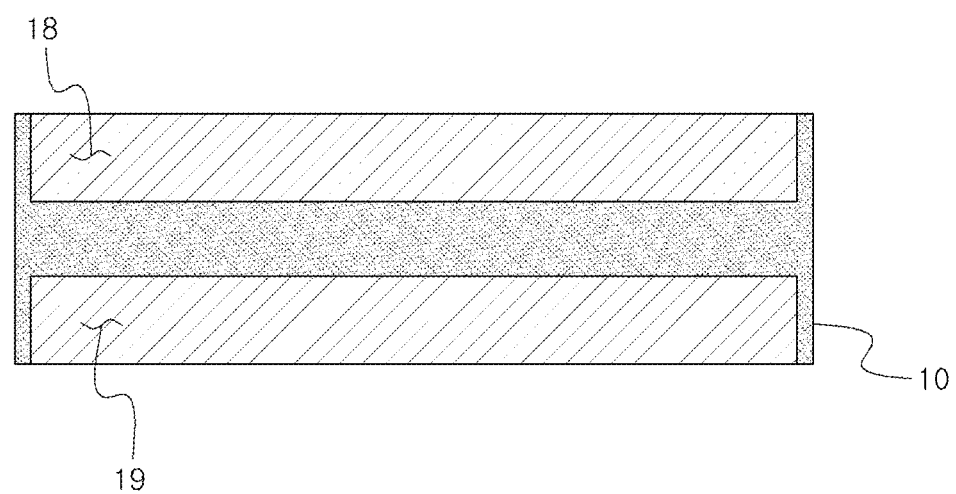

Subsequently, the rear surface of the main body of the frame metal body, in which the first insertion space 18 is formed, is milled to form a second insertion space 19 for inserting the rear metal body. FIGS. 5A and 5B are a plan view and a cross-sectional view taken along the line D-D', respectively, showing a state in which the first and second insertion spaces are formed in the main body of the frame metal body in the metal card having a glass body according to the preferred first embodiment of the present invention.

Figure 6A:
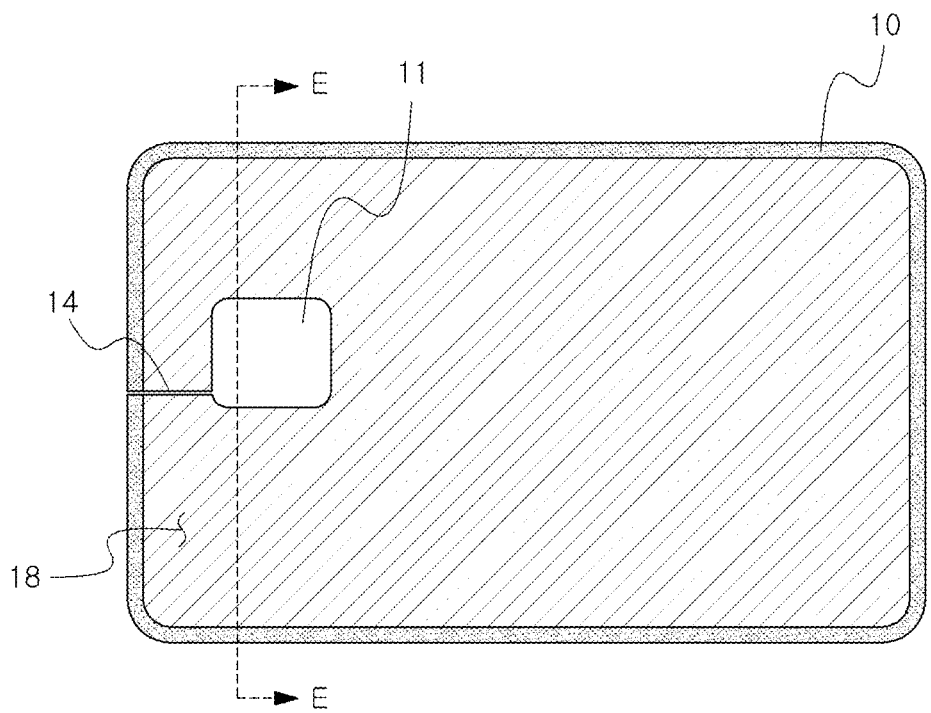
FIGS. 6A and 6B are a plan view and a cross-sectional view taken along line E-E', respectively, showing a state in which a first chip insertion hole and a first slit are formed in a main body of a frame metal body in the metal card having a glass body according to the preferred first embodiment of the present invention.
Figure 6B:
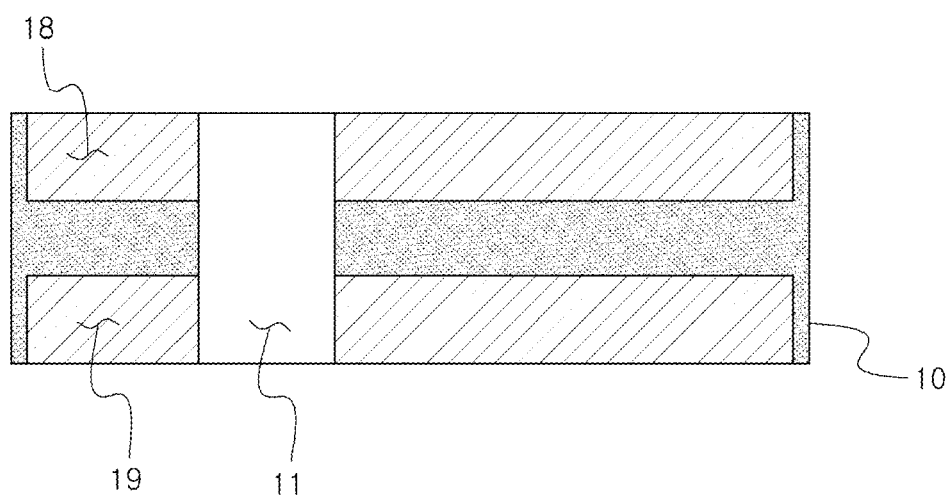

Next, a first chip insertion hole 11 is formed in the main body of the frame metal body, in which first and second insertion spaces are formed, to mount an IC module for a card. Then, a first slit 14 is formed by cutting between an edge of the first chip insertion hole and an edge of the main body. FIGS. 6A and 6B are a plan view and a cross-sectional view taken along line E-E', respectively, showing a state in which the first chip insertion hole and the first slit are formed in the main body of the frame metal body in the metal card having a glass body according to the preferred first embodiment of the present invention.

Next, a predetermined chemical treatment is performed on the surface of the frame metal body 10 in which the first and second insertion spaces 18 and 19, the first chip insertion hole 11, and the first slit 14 are formed, thereby completing the fabrication of the frame metal body. The chemical treatment may include one or more processes selected from anodizing, coating, painting, and plating.

Figure 7A:
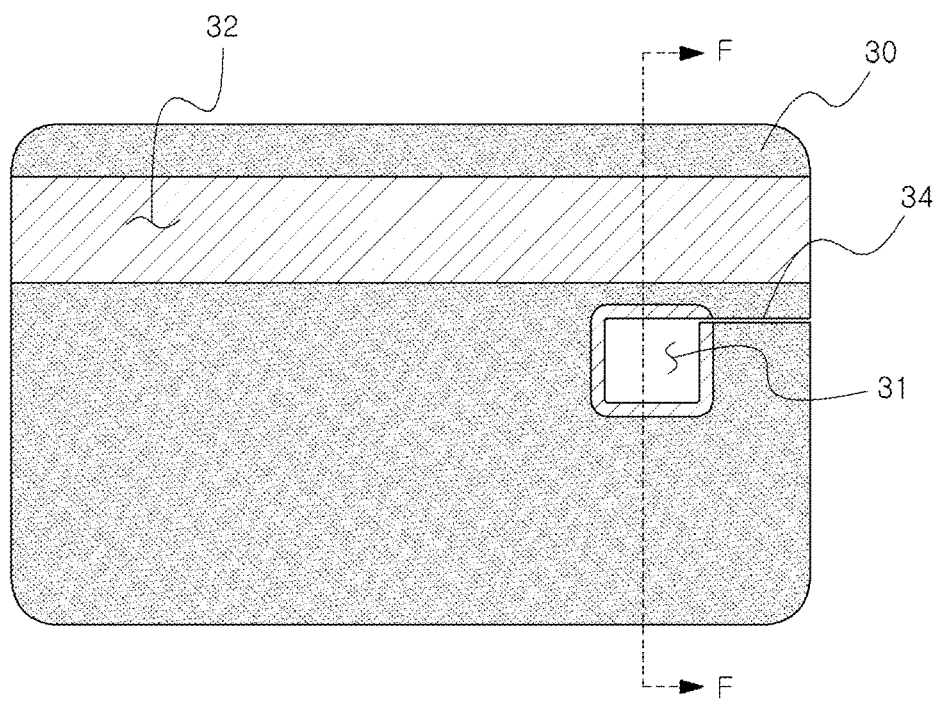
FIGS. 7A and 7B are a plan view and a cross-sectional view taken along line F-F', respectively, showing a state in which an insertion space for a magnetic stripe (MS), a third chip insertion hole, and a second slit are formed on one surface of a main body of a rear metal body in the metal card having a glass body according to the preferred first embodiment of the present invention.
Figure 7B:
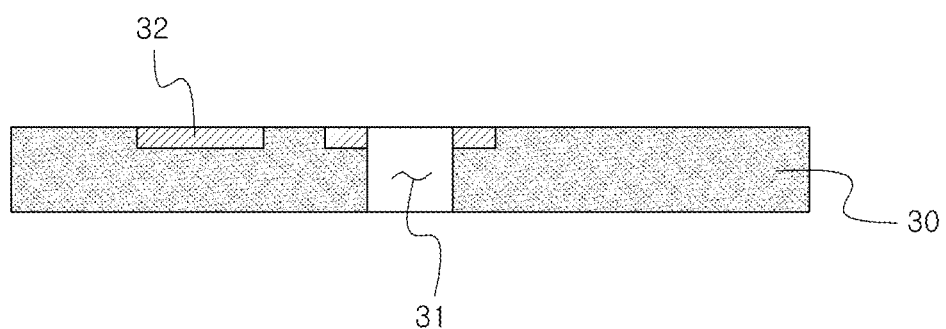

Next, with reference to FIGS. 7 and 8, a process for fabricating the rear metal body 30 will be described. To fabricate the rear metal body according to the first embodiment of the present invention, a metal sheet is first subjected to NC machining to form an outer shape corresponding to the size of the rear metal body. Next, a predetermined area on one surface of the machined rear metal body is milled to form an insertion space 32 for mounting a magnetic stripe 60 and a third chip insertion hole 31 for inserting an IC module for a card. Then, a second slit 34 is formed by cutting between an edge of the third chip insertion hole and an edge of the main body of the rear metal body. FIGS. 7A and 7B are a plan view and a cross-sectional view taken along line F-F', respectively, showing a state in which the insertion space for a magnetic stripe (MS), the third chip insertion hole, and the second slit are formed on one surface of the main body of the rear metal body in the metal card having a glass body according to the preferred first embodiment of the present invention.

Figure 8A:
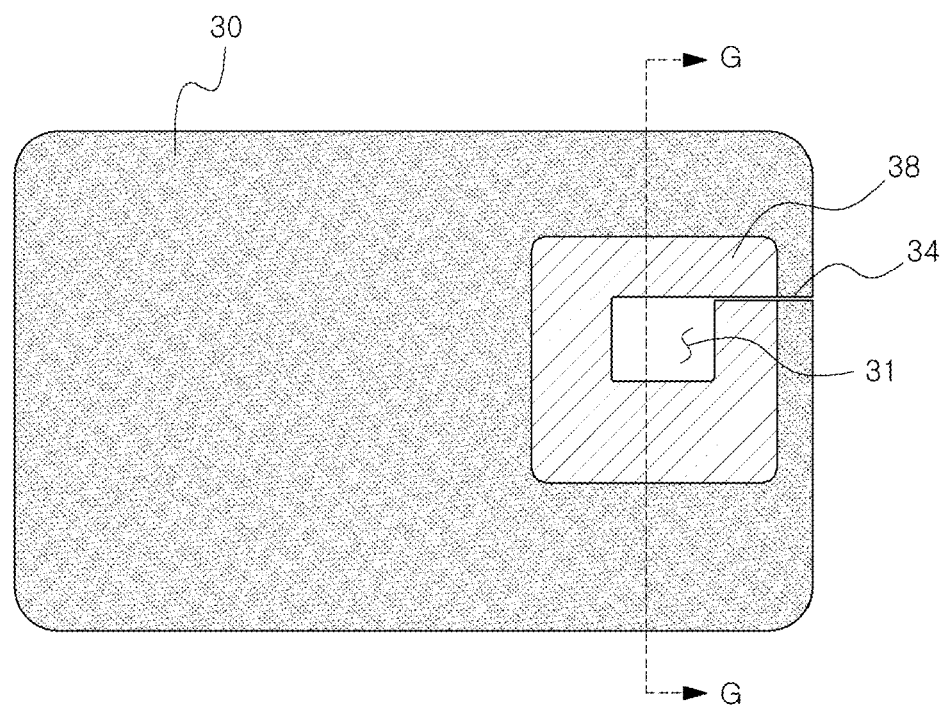
FIGS. 8A and 8B are a plan view and a cross-sectional view taken along line G-G', respectively, showing a state in which an insertion space for an antenna is formed on another surface of a main body of a rear metal body in the metal card having a glass body according to the preferred first embodiment of the present invention.
Figure 8B:
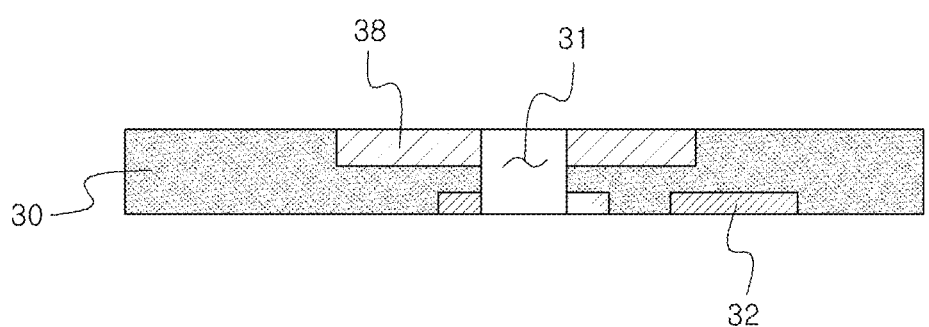

Next, a predetermined area on the surface opposite to the surface in which the insertion space 32 for a magnetic stripe (MS) is formed may be milled to form an antenna insertion space 38 for mounting an antenna module. The antenna insertion space 38 may be formed in a region surrounding the third chip insertion hole 31. FIGS. 8A and 8B are a plan view and a cross-sectional view taken along line G-G', respectively, showing a state in which the antenna insertion space is formed on the other surface of the main body of the rear metal body in the metal card having a glass body according to the preferred first embodiment of the present invention.

Next, a predetermined chemical treatment is performed on the surface of the rear metal body 30 in which the insertion space 32 for a magnetic stripe (MS), the third chip insertion hole 31, the second slit 34, and the antenna insertion space 38 are formed, thereby completing the fabrication of the rear metal body. The chemical treatment may include one or more processes selected from anodizing, coating, painting, and plating.

Figure 9:
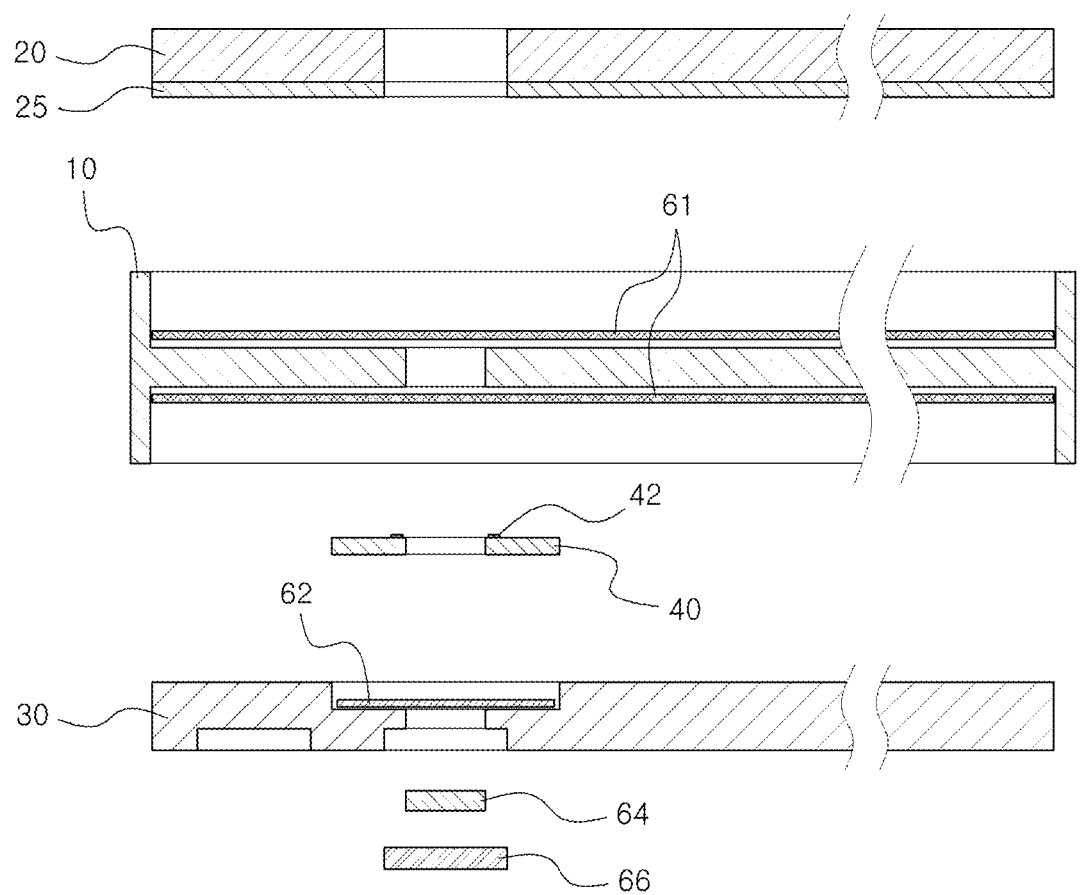
FIGS. 9 and 10 are cross-sectional views taken along line A-A', respectively, illustrating the manufacturing method of the metal card having a glass body according to the preferred first embodiment of the present invention, showing the states before and after assembly of all components.
Figure 10:
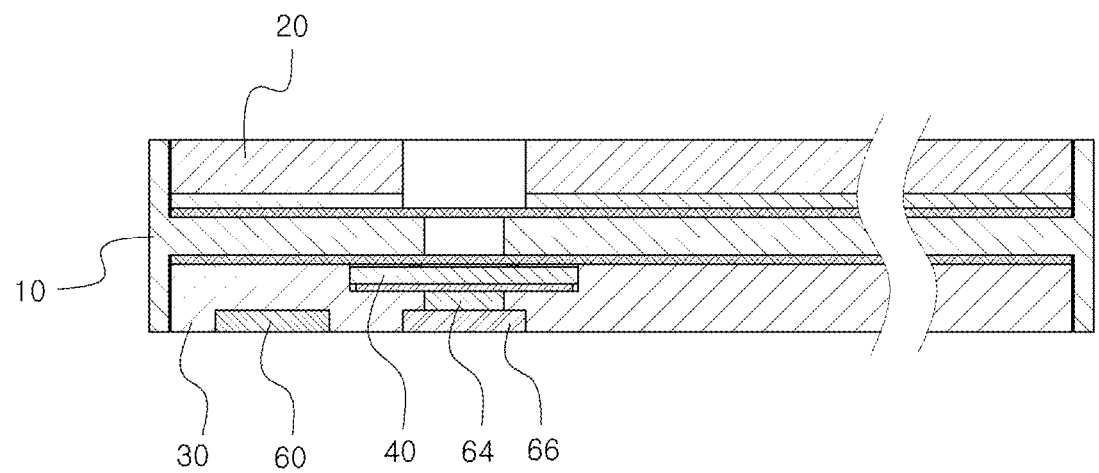

FIGS. 9 and 10 are cross-sectional views illustrating the states before and after assembly of all components in the method for manufacturing the metal card having a glass body according to the preferred first embodiment of the present invention. Referring to FIGS. 9 and 10, in the first insertion space on the front side of the frame metal body completed through the foregoing processes, a glass body having a 3D pattern printed layer and an adhesive film is assembled. In the antenna insertion space of the rear metal body, an adhesive film and an antenna module are assembled. Then, the rear metal body, on which the antenna module is mounted, together with an adhesive film, is assembled into the second insertion space on the rear side of the frame metal body. A magnetic stripe 60 is assembled into the insertion space 32 for a magnetic stripe (MS) in the rear metal body. First and second PVC modules 64 and 66 are assembled into the exposed space of the third chip insertion hole in the rear metal body.

Figure 11:
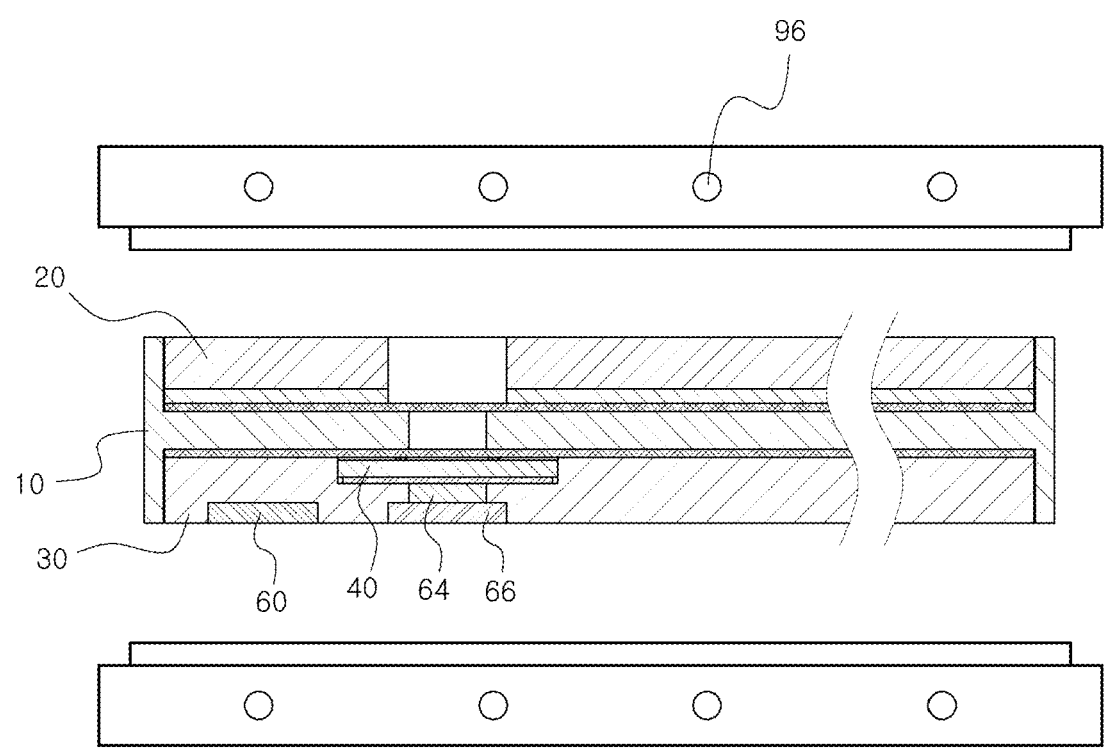
FIG. 11 is a schematic view illustrating a laminating process of the assembled components in the method for manufacturing the metal card having a glass body according to the preferred first embodiment of the present invention.
Figure 12:
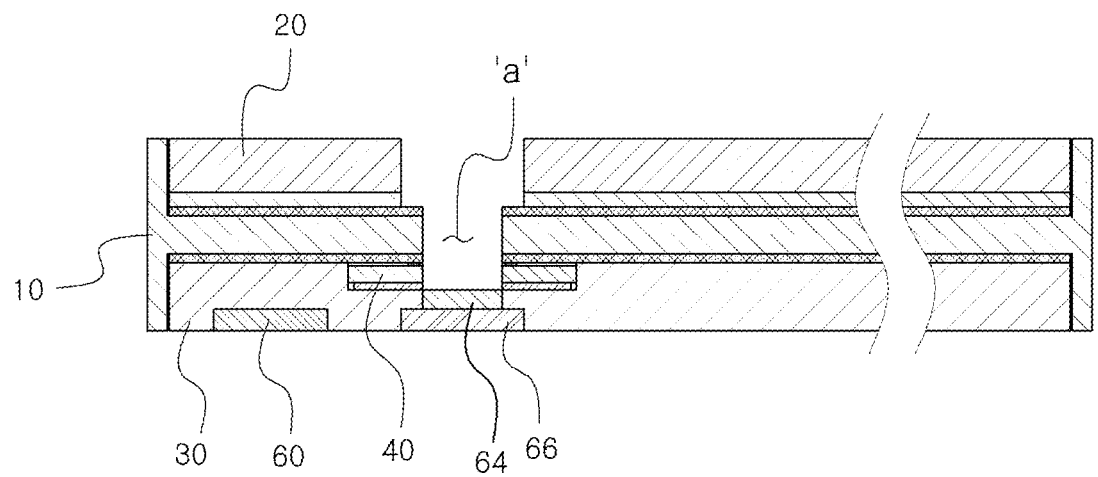
FIG. 12 is a schematic view illustrating a state in which the laminated result is milled in the method for manufacturing the metal card having a glass body according to the preferred first embodiment of the present invention.

FIG. 11 is a schematic view illustrating a laminating process of the assembled components in the method for manufacturing the metal card having a glass body according to the preferred first embodiment of the present invention. Referring to FIG. 11, the assembled result is laminated by applying heat and pressure using a pressing device 96 equipped with a heater. FIG. 12 is a schematic view illustrating a state in which the laminated result is milled in the method for manufacturing the metal card having a glass body according to the preferred first embodiment of the present invention. Referring to FIG. 12, the laminated result is milled to form a space 'a' for inserting the IC module for a card.

Figure 13:
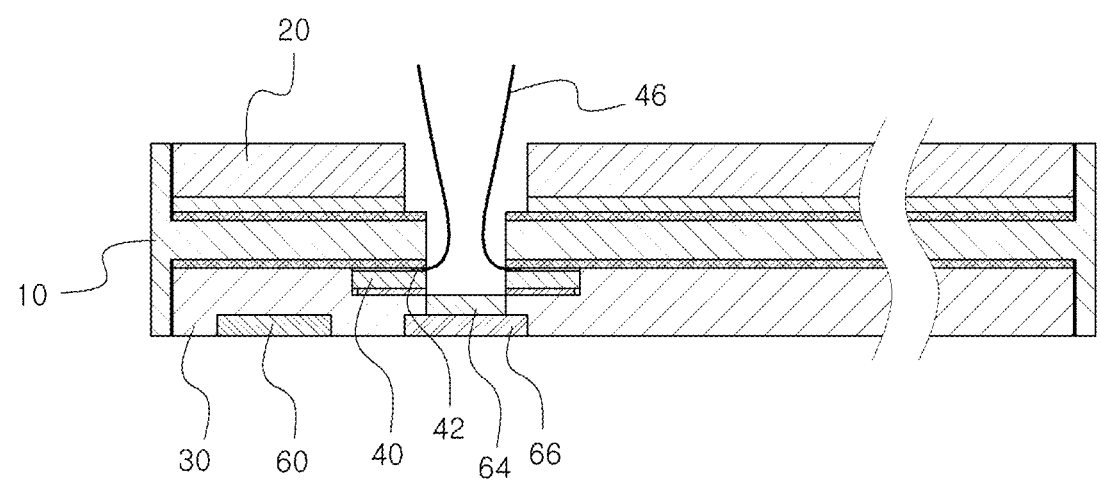
FIG. 13 is a schematic view illustrating a state in which a coil is connected to an antenna module in the method for manufacturing the metal card having a glass body according to the preferred first embodiment of the present invention.
Figure 14:
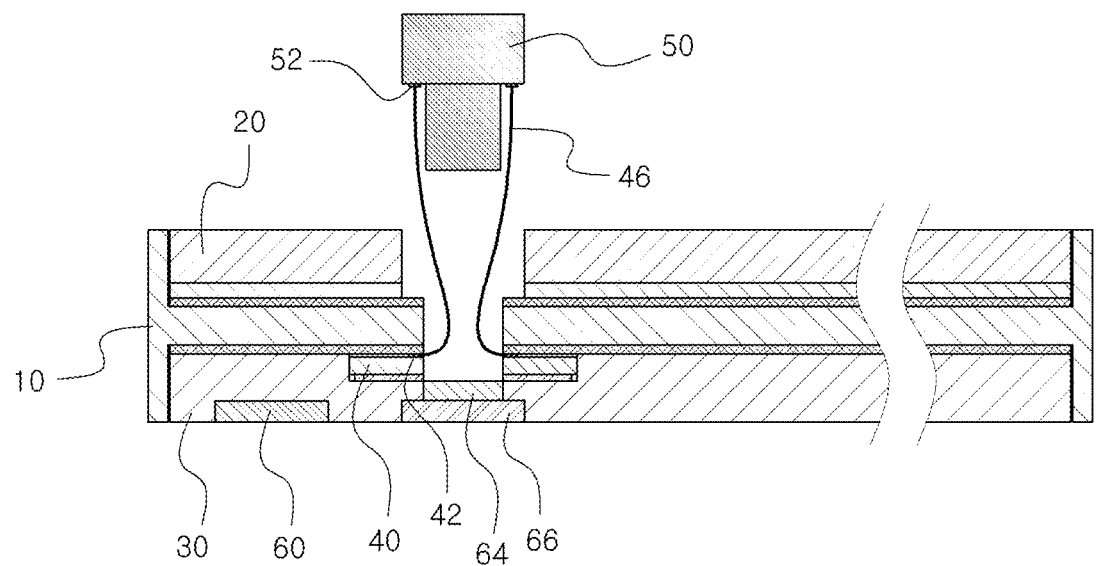
FIG. 14 is a schematic view illustrating a state in which an antenna coil is connected to an IC module for a card in the method for manufacturing the metal card having a glass body according to the preferred first embodiment of the present invention.

FIG. 13 is a schematic view illustrating a state in which a coil is connected to the antenna module in the method for manufacturing the metal card having a glass body according to the preferred first embodiment of the present invention. Referring to FIG. 13, two ends of the coil 46 are connected to two contact points 42 of the antenna module, respectively. FIG. 14 is a schematic view illustrating a state in which a coil is connected to the IC module for a card in the method for manufacturing the metal card having a glass body according to the preferred first embodiment of the present invention. Referring to FIG. 14, two contact points 52 of the IC module for a card 50 are spot-welded to the two ends of the coil 46 connected to the antenna module, respectively.

Figure 15:
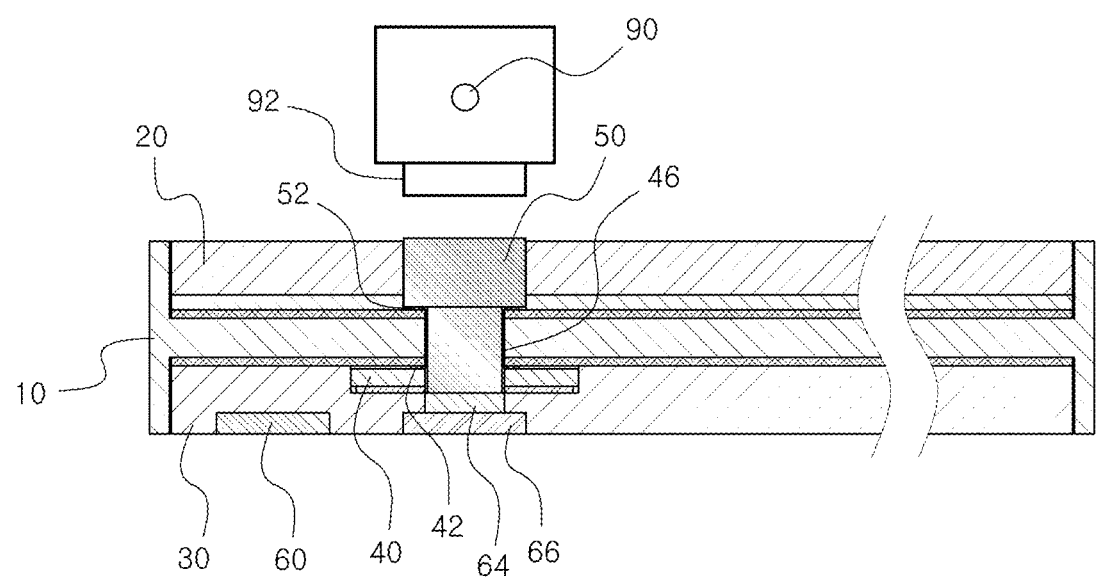
FIG. 15 is a schematic view illustrating a chip embedding process in the method for manufacturing the metal card having a glass body according to the preferred first embodiment of the present invention.

FIG. 15 is a schematic view illustrating a chip embedding process in the method for manufacturing the metal card having a glass body according to the preferred first embodiment of the present invention. Referring to FIG. 15, heat and pressure are applied to the result in which the antenna module and the IC module for a card are connected by the coil, using an embedding mold 92 equipped with a heater 90, thereby embedding the chip and completing the product.

Second Embodiment

Figure 16A:
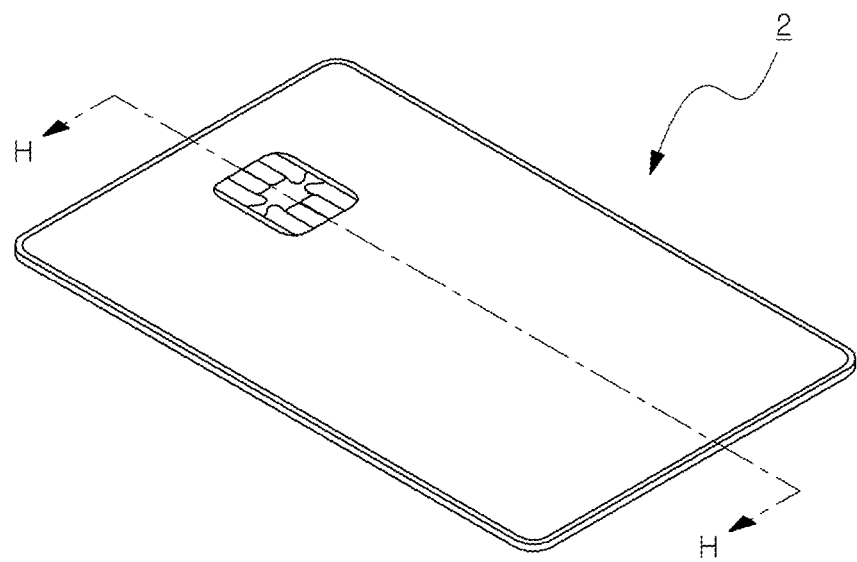
FIGS. 16A and 16B are a perspective view and a cross-sectional view, respectively, of the metal card having a glass body according to the second embodiment of the present invention.
Figure 16B:
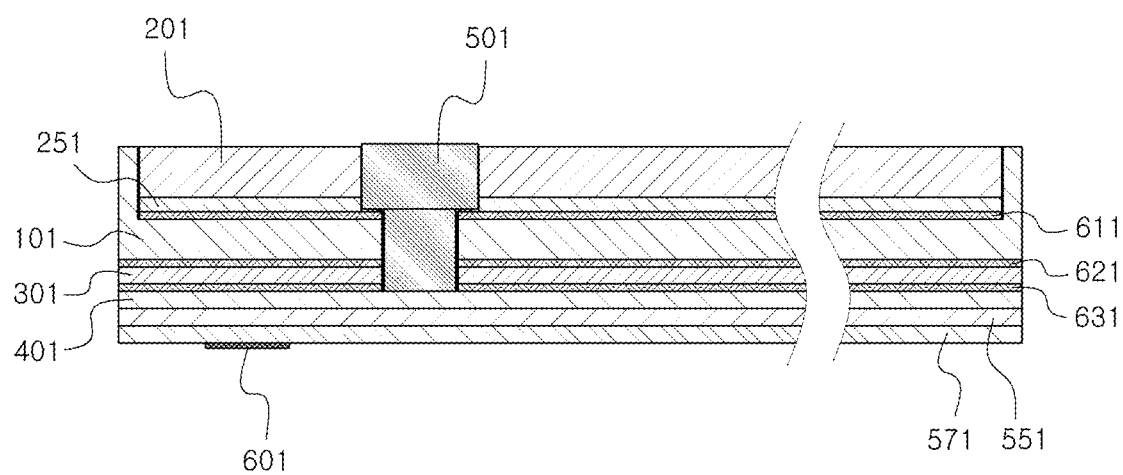
Figure 17:
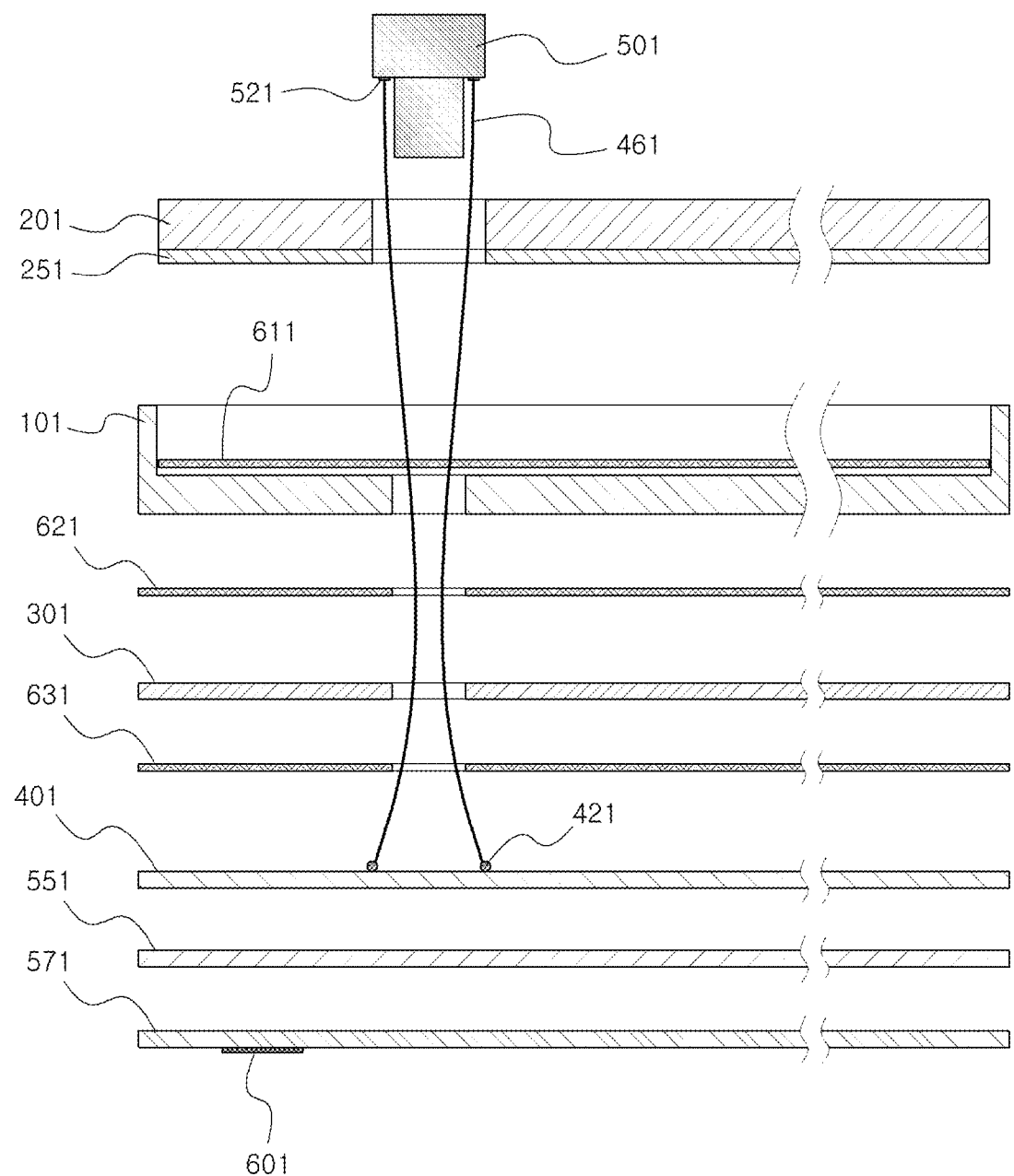
FIG. 17 is an exploded cross-sectional view taken along line H-H' of FIG. 16.

Hereinafter, a metal card having a glass body according to the second embodiment of the present invention will be described in detail with reference to the accompanying drawings. FIGS. 16A and 16B are a perspective view and a cross-sectional view, respectively, of the metal card having a glass body according to the second embodiment of the present invention. FIG. 17 is an exploded cross-sectional view taken along line H-H' of FIG. 16.

Referring to FIGS. 16A, 16B and 17, a metal card 2 according to the present invention includes a frame metal body 101, a glass body 201, an EMI absorption sheet 301, an antenna inlay sheet 401, a 3D pattern printed layer 251, a rear printed sheet 551, a rear protective sheet 571, and an IC module for a card 501.

Figure 18A:
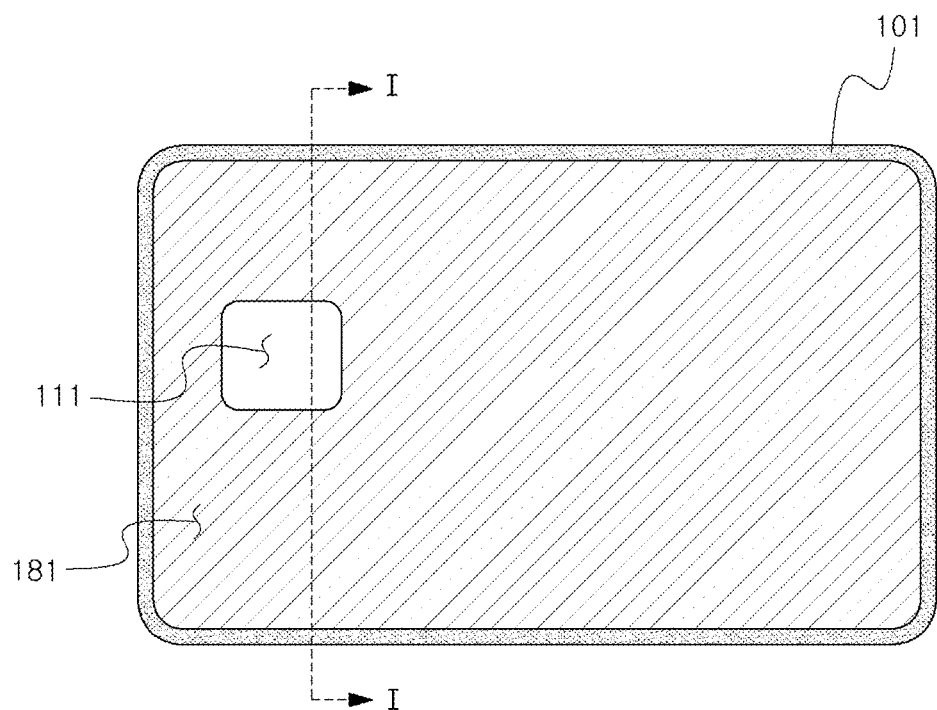
FIGS. 18A and 18B are a plan view and a cross-sectional view taken along line I-I', respectively, showing a state in which an insertion space for a glass body and a first chip insertion hole are formed in a main body of a frame metal body in the metal card having a glass body according to the second embodiment of the present invention.
Figure 18B:
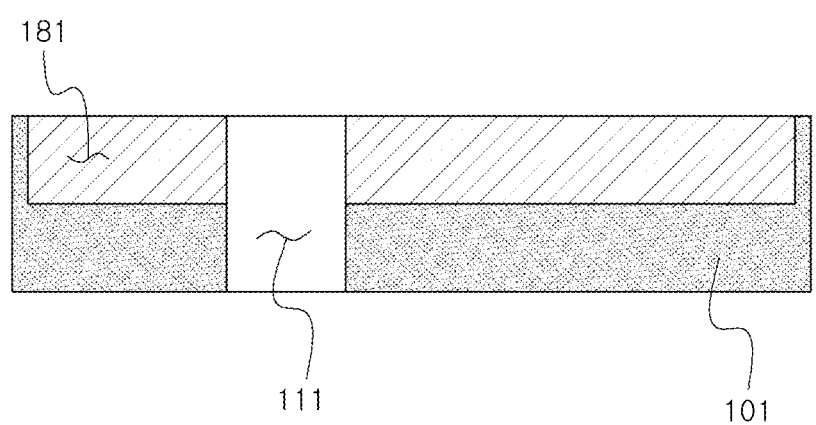

FIGS. 18A and 18B are a plan view and a cross-sectional view taken along line I-I', respectively, showing a state in which an insertion space for a glass body and a first chip insertion hole are formed in the main body of the frame metal body in the metal card having a glass body according to the second embodiment of the present invention. Referring to FIG. 18, the main body of the frame metal body 101 is made of a metal sheet having a predetermined size of the metal card. The main body of the frame metal body 101 includes a glass body insertion space 181 on its upper surface for receiving the glass body. In addition, the main body of the frame metal body 101 includes a first chip insertion hole 111.

Figure 19A:
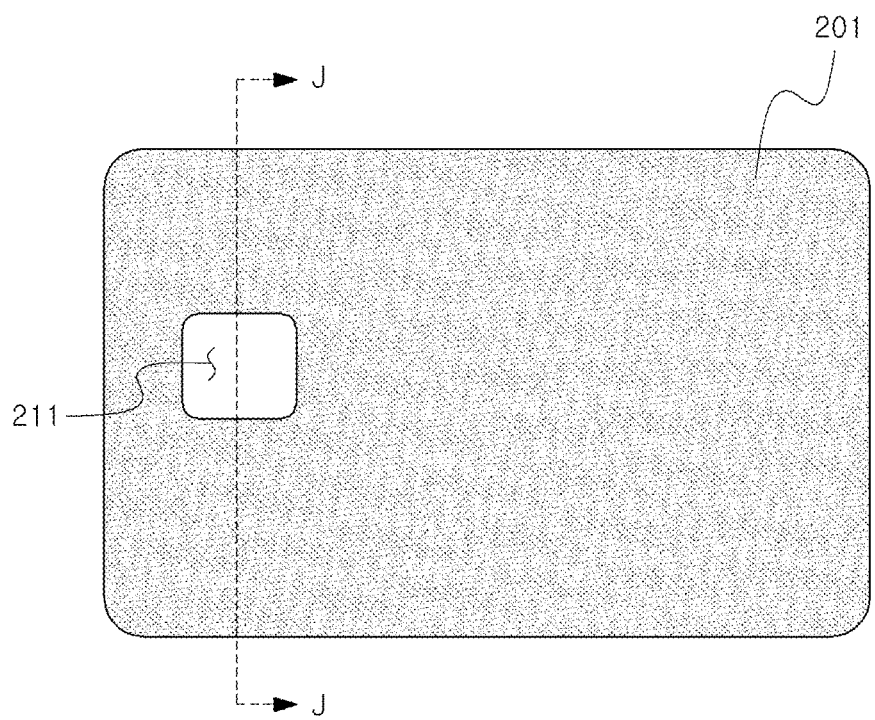
FIGS. 19A and 19B are a plan view and a cross-sectional view taken along line J-J', respectively, showing a glass body in which a second chip insertion hole is formed and a three-dimensional pattern layer in the metal card having a glass body according to the second embodiment of the present invention.
Figure 19B:
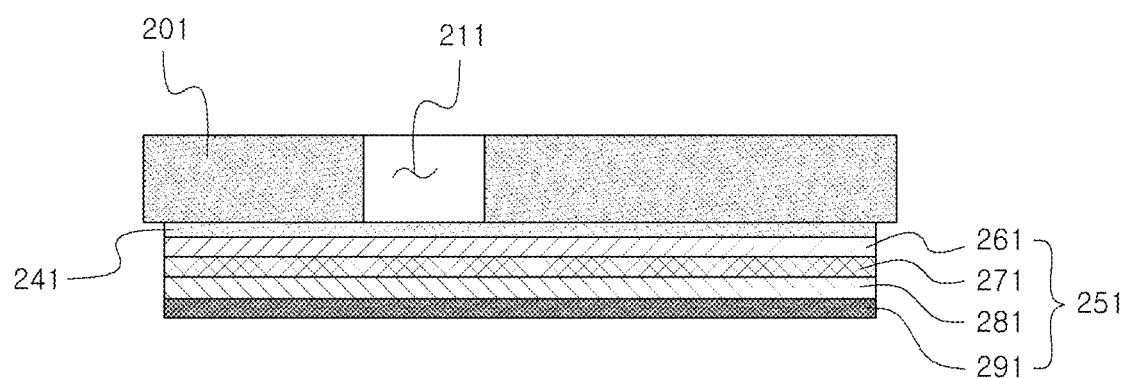

FIGS. 19A and 19B are a plan view and a cross-sectional view taken along line J-J', respectively, showing the glass body and the 3D pattern layer, with a second chip insertion hole formed therein, in the metal card having a glass body according to the second embodiment of the present invention. Referring to FIG. 19, the glass body 201 is formed of a sheet made of a glass material and has a size configured to be insertable into the glass body insertion space of the frame metal body. The glass body includes a second chip insertion hole 211 at a position corresponding to the first chip insertion hole 111.

A 3D pattern printed layer 251 may be provided between the rear surface of the glass body and the upper surface of the frame metal body. The 3D pattern printed layer 251 may be composed of only a printed layer 261; a combination of the printed layer 261, a UV 3D pattern layer 271, a deposition layer 281, and a light-blocking layer 291; or any combination of two or more of these components. The 3D pattern printed layer can provide an excellent three-dimensional effect through the surface of the glass body. The 3D pattern printed layer 251 may have the same structure as the 3D pattern printed layer of the first embodiment.

Meanwhile, the metal card may further include a shatterproof film 241 between the glass body and the 3D pattern printed layer. The shatterproof film 241 may have the same structure as the shatterproof film of the first embodiment. By further disposing an adhesive sheet 611 between the 3D pattern printed layer 251 and the frame metal body 101, the adhesive strength between the 3D pattern printed layer and the frame metal body can be improved.

The EMI absorption sheet 301 is a sheet manufactured to a predetermined thickness by mixing powders of materials having electromagnetic wave absorption properties with a binder, and is disposed between the frame metal body 101 and the antenna inlay sheet 401. Generally, the IC module for a card communicates with an external card reader in a contactless manner by using an electromotive force induced through the antenna. However, when a frame metal body made of a metallic material is placed between the antenna and the card reader, the metallic frame metal body may interfere with the transmission and reception of signals between the antenna and the card reader. To address this problem, the metal card according to the present embodiment is configured such that the EMI absorption sheet is disposed between the frame metal body and the antenna inlay sheet, thereby enabling smooth signal transmission and reception between the antenna and the card reader.

The EMI absorption sheet 301 may be formed by mixing silicon (Si), chromium (Cr), iron (Fe), and a binder in amounts of 1 to 10 wt %, 1 to 10 wt %, 70 to 90 wt %, and 5 to 15 wt %, respectively. The binder of the EMI absorption sheet may be made of a urethane-based resin. The thickness of the EMI absorption sheet is preferably determined based on the communication performance at the communication frequency of the IC module for a card. Typically, the radio frequency used in IC modules for cards ranges from 13.56 MHz to 19 MHz. Accordingly, the thickness of the EMI absorption sheet can be determined so as to enable RF communication within this frequency range.

The antenna inlay sheet 401 is disposed between the EMI absorption sheet and the rear printed sheet. The antenna inlay sheet 401 is a sheet whose main body is made of a synthetic resin material, and an antenna 32, which is wound several turns to form a closed loop, may be mounted on one surface thereof. Meanwhile, as used in the present specification, the synthetic resin material may be one selected from polyvinyl chloride (PVC), polyethylene terephthalate (PET), polyethylene terephthalate glycol (PET-G), and polycarbonate (PC).

By disposing adhesive sheets 621 and 631 between the EMI absorption sheet and the frame metal body, and between the EMI absorption sheet and the antenna inlay sheet, respectively, the adhesive strength of the EMI absorption sheet can be improved. The adhesive sheets 611, 621, and 631 are hot-melt sheets used to bond upper and lower sheets to each other by means of heat and pressure. In the manufacturing process, the adhesive sheets are placed between the upper and lower sheets, and as heat and pressure are applied, they bond the sheets together.

The rear printed sheet 551 is a sheet made of a synthetic resin material having a predetermined pattern or the like printed on its surface, and the rear protective sheet 571 is a sheet made of a transparent synthetic resin material. The rear printed sheet and the rear protective sheet may be sequentially laminated on the rear surface of the antenna inlay sheet. A magnetic stripe 601 may be mounted on the surface of the rear protective sheet 571.

The IC module for a card 501 is mounted in the first and second insertion holes, and the contacts of the IC module for a card 501 are electrically connected to the contacts of the antenna. The IC module for a card 501 has the same structure as the IC module for a card of the first embodiment.

Hereinafter, a detailed description will be given of a method for manufacturing the metal card having a glass body according to the second embodiment of the present invention. The method for manufacturing the metal card according to the second embodiment of the present invention includes separately fabricating a glass body 201 having a 3D pattern printed layer 251 formed on one surface, a frame metal body 101, an EMI absorption sheet 301, an antenna inlay sheet 401, a rear printed sheet 551, a rear protective sheet 571, and a magnetic stripe 601, and then sequentially stacking and laminating them. Next, an IC module for a card 501 is connected to the contact points of the antenna on the antenna inlay sheet, and the chip is embedded by applying heat and pressure, thereby completing the metal card. Hereinafter, each of the manufacturing steps will be described in detail.

First, a process for fabricating the glass body 201 and the 3D pattern printed layer 251 will be described. Referring to FIG. 19, the glass body 201 is completed by machining a glass sheet into a desired outer shape and forming a second chip insertion hole 211 in which an IC module for a card will be mounted. Next, a printed layer 261, a UV pattern layer 271, a deposition layer 281, and a light-blocking layer 291 are sequentially formed on the rear surface of the glass body to complete the 3D pattern printed layer 251.

At this time, before forming the 3D pattern printed layer 251, a shatterproof film 241 may additionally be applied to the rear surface of the glass body 201. The shatterproof film 241 not only serves as an adhesive layer between the glass body and the 3D pattern printed layer, but also prevents cracks from occurring in the glass and prevents fragments from scattering in the event the glass is broken.

Next, a process for fabricating the frame metal body 101 will be described. Referring to FIG. 18, the main body of the frame metal body is fabricated by NC machining a metal sheet to an outer shape corresponding to the frame size. Then, the front surface of the main body of the frame metal body is milled to a predetermined depth to form a glass body insertion space 181 for receiving the glass body. Next, a first chip insertion hole 111, in which an IC module for a card will be mounted, is formed in the main body of the frame metal body having the glass body insertion space on its front surface.

Next, a predetermined chemical treatment is performed on the surface of the frame metal body 101 in which the glass body insertion space 181 and the first chip insertion hole 111 are formed, thereby completing the fabrication of the frame metal body. The chemical treatment may include one or more processes selected from anodizing, coating, painting, and plating.

Figure 20:
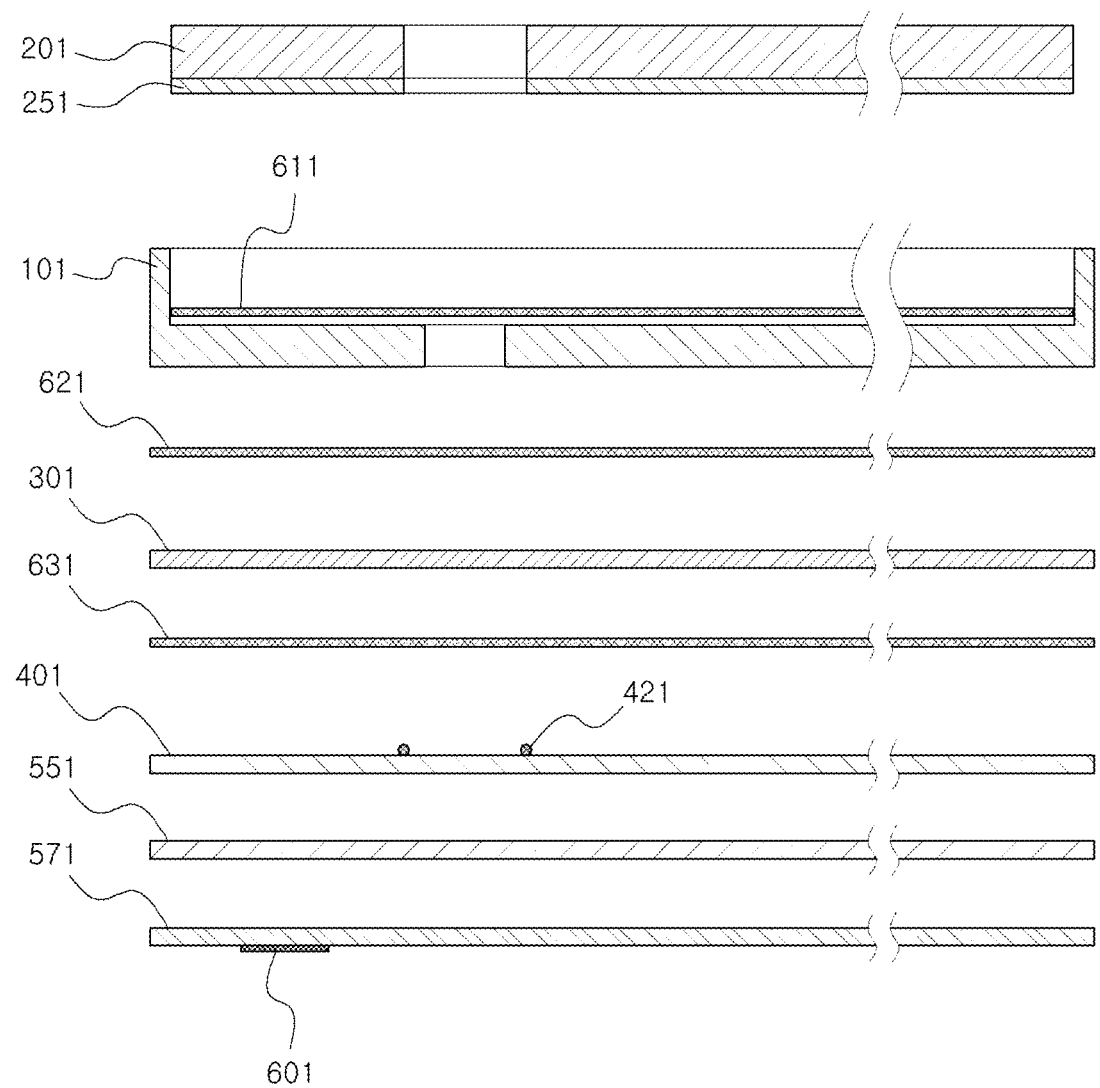
FIGS. 20 and 21 are cross-sectional views illustrating the states before and after assembly of all components in the method for manufacturing the metal card having a glass body according to the second embodiment of the present invention.
Figure 21:
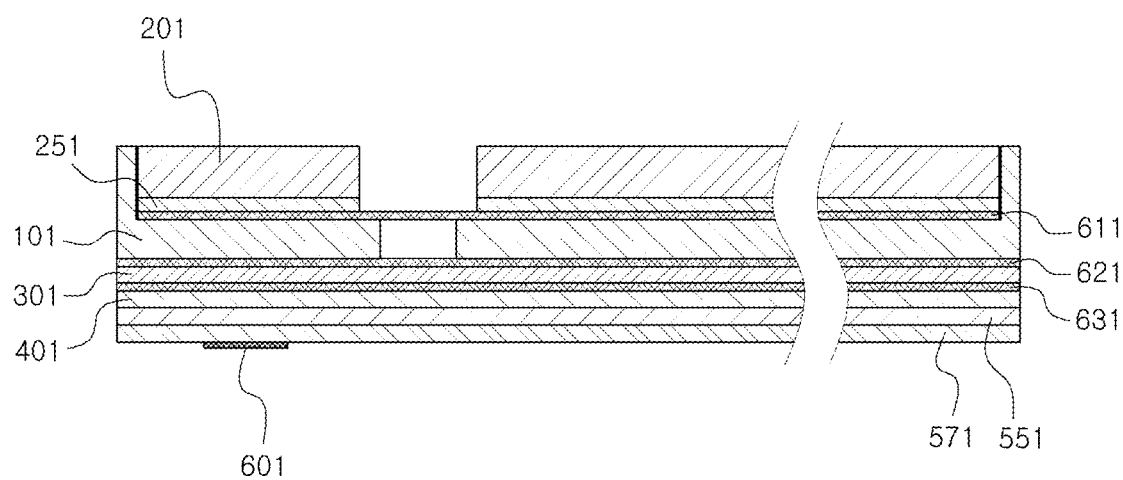

FIGS. 20 and 21 are cross-sectional views illustrating the states before and after assembly of all components in the method for manufacturing the metal card having a glass body according to the second embodiment of the present invention. Referring to FIGS. 20 and 21, an adhesive sheet 611 and a glass body 201 having a 3D pattern printed layer 251 are assembled into the glass body insertion space on the front surface of the frame metal body 101, which has been completed through the above-described processes. Next, on the rear surface of the frame metal body, an adhesive sheet 621, an EMI absorption sheet 301, an adhesive sheet 631, an antenna inlay sheet 401, a rear printed sheet 551, a rear protective sheet 571, and a magnetic stripe 601 are sequentially placed and laminated.

Figure 22:
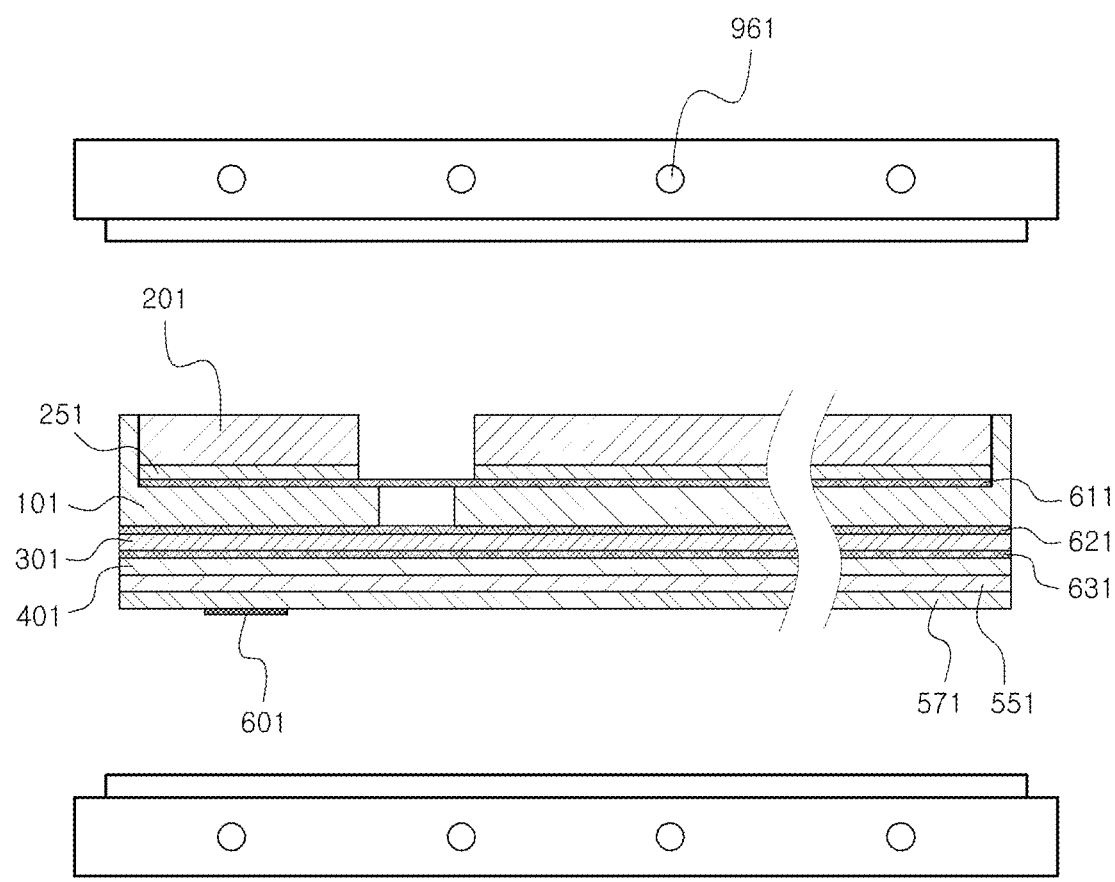
FIG. 22 is a schematic view illustrating a laminating process of the assembled components in the method for manufacturing the metal card having a glass body according to the second embodiment of the present invention.
Figure 23:
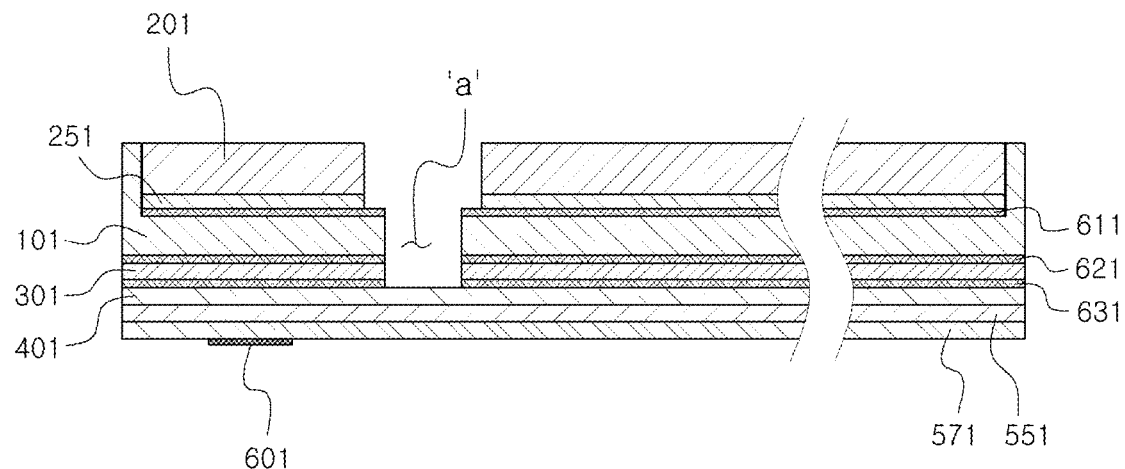
FIG. 23 is a schematic view illustrating a state in which the laminated result is milled to provide a space for inserting an IC module for a card in the method for manufacturing the metal card having a glass body according to the second embodiment of the present invention.

FIG. 22 is a schematic view illustrating a laminating process of the assembled components in the method for manufacturing the metal card having a glass body according to the second embodiment of the present invention. Referring to FIG. 22, the assembled result is laminated by applying heat and pressure using a pressing device equipped with a heater 961. FIG. 23 is a schematic view illustrating a state in which the laminated result is milled to form a chip insertion space in the method for manufacturing the metal card having a glass body according to the second embodiment of the present invention. Referring to FIG. 23, in order to allow insertion of the IC module for a card, one surface of the laminated result is milled to form a space 'a' into which the IC module can be inserted.

Figure 24:
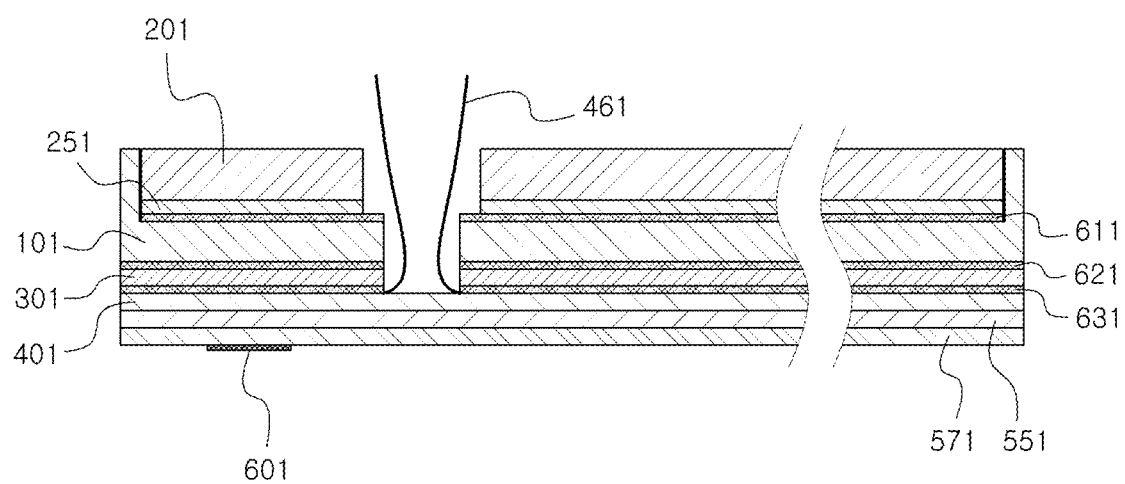
FIG. 24 is a schematic view illustrating a state in which a coil is connected to antenna contact points of an antenna inlay sheet in the method for manufacturing the metal card having a glass body according to the second embodiment of the present invention.
Figure 25:
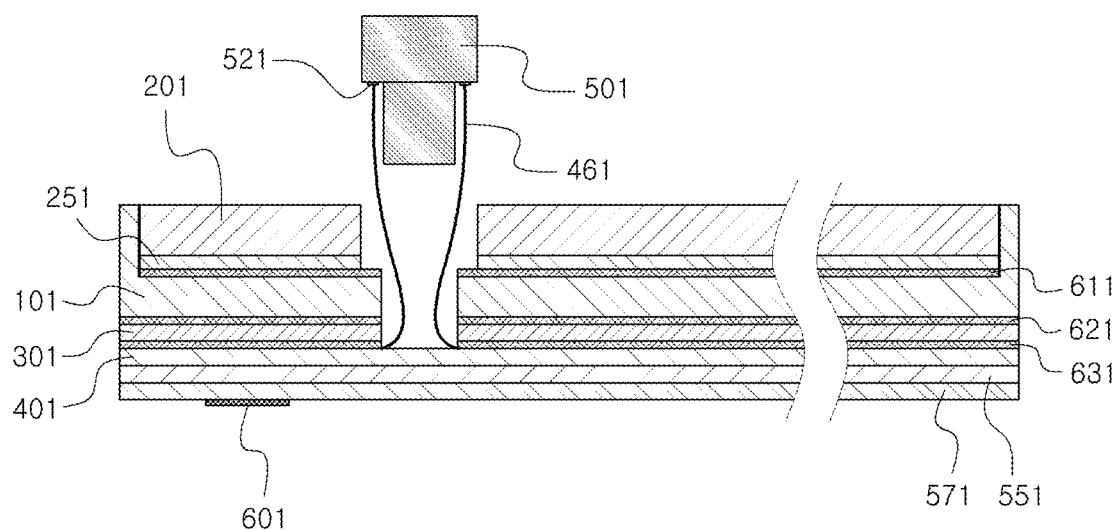
FIG. 25 is a schematic view illustrating a state in which the coil is connected to an IC module for a card in the method for manufacturing the metal card having a glass body according to the second embodiment of the present invention.

FIG. 24 is a schematic view illustrating a state in which a coil is connected to the antenna of the antenna inlay sheet in the method for manufacturing the metal card having a glass body according to the second embodiment of the present invention. Referring to FIG. 24, a coil 461 is connected to the contact point 42s of the antenna. FIG. 25 is a schematic view illustrating a state in which a coil is connected to the IC module for a card in the method for manufacturing the metal card having a glass body according to the second embodiment of the present invention. Referring to FIG. 25, the ends of the coil 461 connected to the antenna are spot-welded to contact points 521 of the IC module for a card 501, respectively, thereby electrically connecting the antenna to the IC module.

Figure 26:
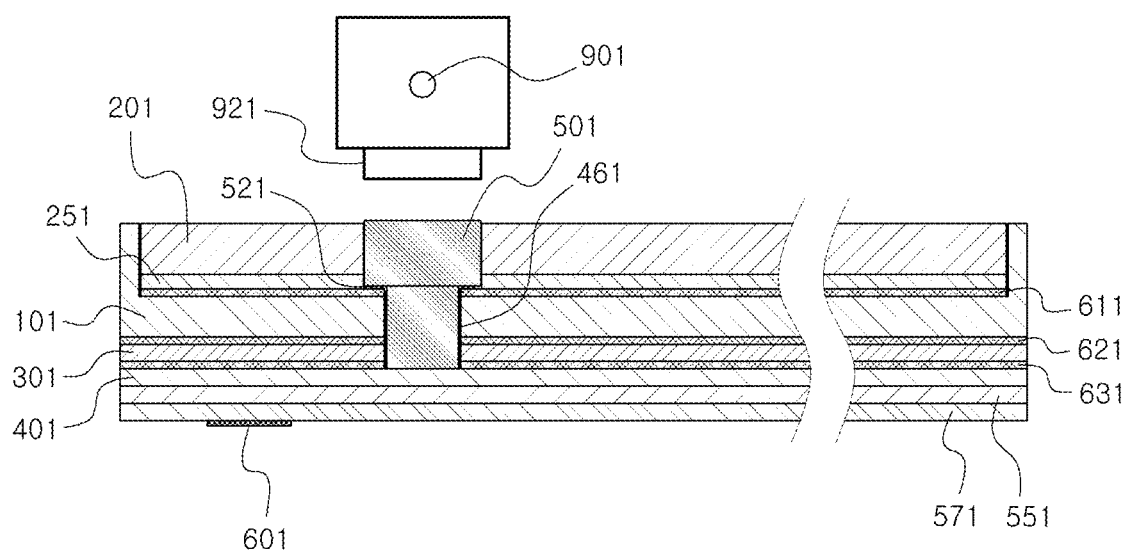
FIG. 26 is a schematic view illustrating a chip embedding process in the method for manufacturing the metal card having a glass body according to the second embodiment of the present invention.

FIG. 26 is a schematic view illustrating a chip embedding process in the method for manufacturing the metal card having a glass body according to the second embodiment of the present invention. Referring to FIG. 26, heat and pressure are applied to the result in which the antenna inlay sheet and the IC module for a card are connected to each other, using an embedding mold 921 equipped with a heater 901, thereby embedding the chip and completing the fabrication of the metal card.

Third Embodiment

Figure 27A:
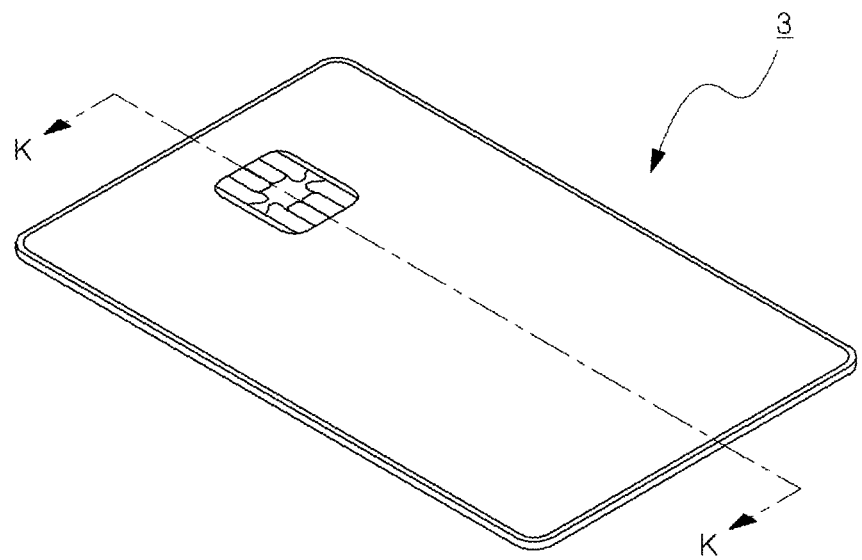
FIGS. 27A and 27B are a perspective view and a cross-sectional view, respectively, of the metal card having a glass body according to the third embodiment of the present invention.
Figure 27B:
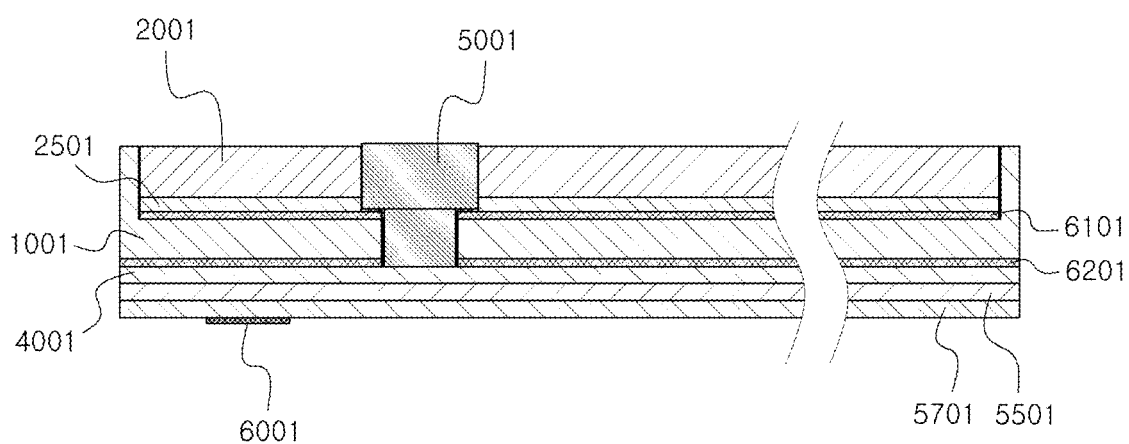
Figure 28:
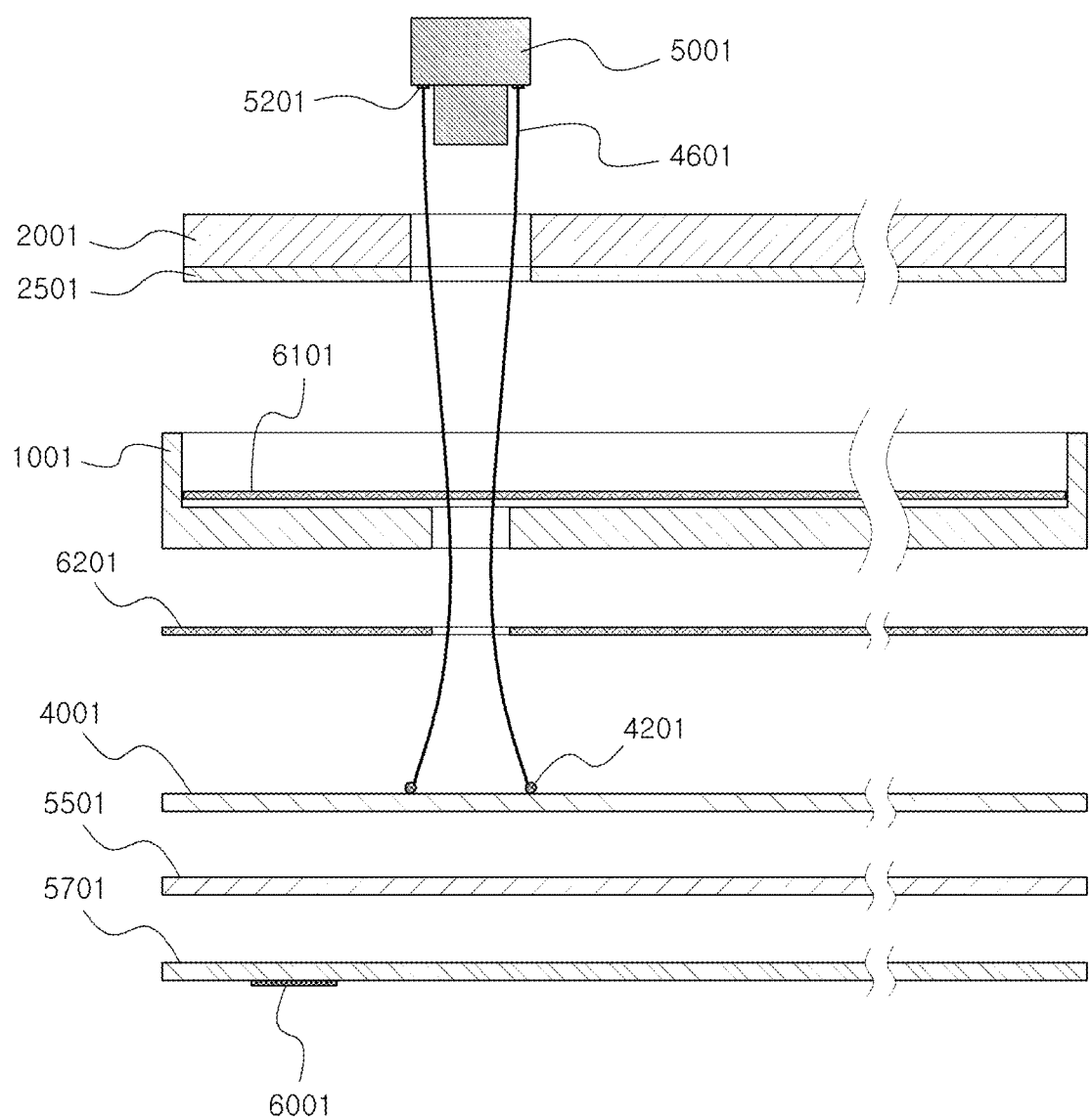
FIG. 28 is an exploded cross-sectional view taken along line K-K' of FIG. 27.

Hereinafter, a metal card having a glass body according to the third embodiment of the present invention will be described in detail with reference to the accompanying drawings. FIGS. 27A and 27B are a perspective view and a cross-sectional view, respectively, of the metal card having a glass body according to the third embodiment of the present invention. FIG. 28 is an exploded cross-sectional view taken along line K-K' of FIG. 27.

Referring to FIGS. 27 and 28, a metal card 3 according to the third embodiment of the present invention includes a frame metal body 1001, a glass body 2001, a 3D pattern printed layer 2501, an antenna inlay sheet 4001, a rear printed sheet 5501, a rear protective sheet 5701, a magnetic stripe 6001, and an IC module for a card 5001. Unlike the second embodiment, the metal card according to the present embodiment does not include an EMI absorption sheet, and is characterized by having a slit formed in the frame metal body. The remaining components of the metal card according to the present embodiment are the same as those of the metal card of the second embodiment, and thus redundant descriptions are omitted.

Figure 29A:
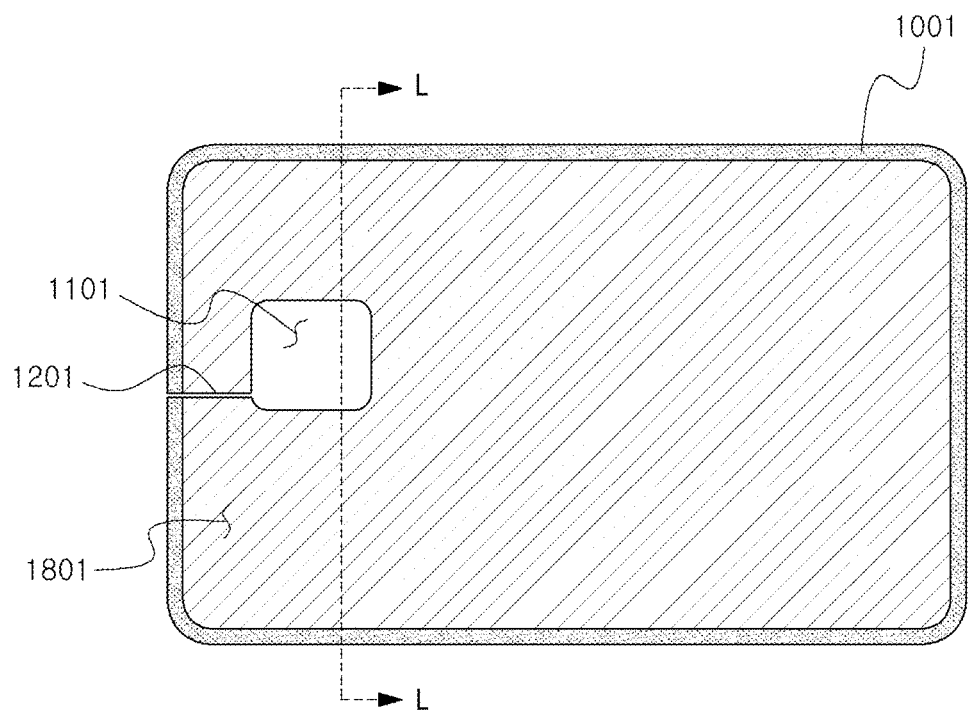
FIGS. 29A and 29B are a plan view and a cross-sectional view taken along line L-L', respectively, showing a state in which an insertion space for a glass body, a first chip insertion hole, and a slit are formed in a main body of a frame metal body in the metal card having a glass body according to the third embodiment of the present invention.
Figure 29B:
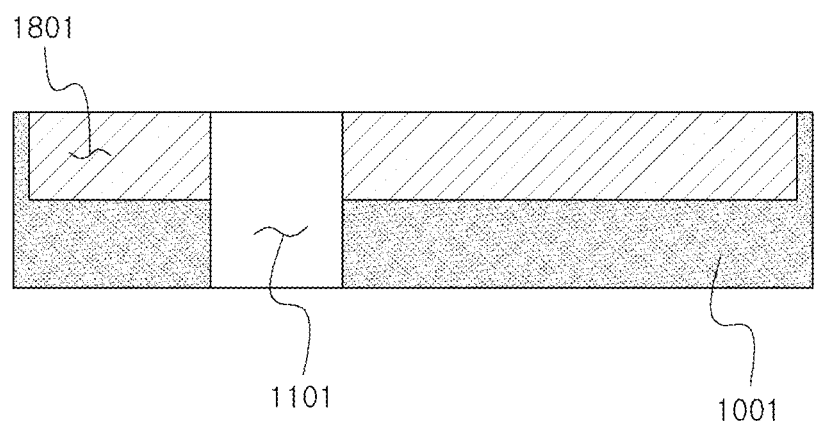

FIGS. 29A and 29B are a plan view and a cross-sectional view taken along line L-L', respectively, showing a state in which a glass body insertion space, a first chip insertion hole, and a slit are formed in the main body of the frame metal body in the metal card having a glass body according to the third embodiment of the present invention. Referring to FIG. 29, the main body of the frame metal body 1001 is made of a metal having a predetermined size of a metal card. The frame metal body 1001 includes a glass body insertion space 1801 on an upper surface of the main body for receiving a glass body. In addition, the frame metal body 1001 includes a first chip insertion hole 1101 and a slit 1201.

The slit 1201 may be formed by cutting between an edge of the main body of the frame metal body and an edge of the first chip insertion hole 1101. In general, the IC module for a card communicates with an external card reader in a contactless manner using electromotive force induced through the antenna. However, when the frame metal body made of a metallic material is positioned between the antenna and the card reader, the metal frame body may interfere with signal transmission and reception between the antenna and the card reader. To solve this problem, the metal card according to the present embodiment is configured to include a slit 1201 in the frame metal body. Accordingly, even without a separate EMI absorption sheet, the metal card according to the present embodiment enables smooth data transmission and reception between the antenna and the card reader.

Hereinafter, a detailed description will be given of the method for manufacturing a metal card having a glass body according to the third embodiment of the present invention. The method for manufacturing the metal card according to the third embodiment includes fabricating a glass body 2001 having a 3D pattern printed layer 2501 formed on one surface, a frame metal body 1001, an antenna inlay sheet 4001, a rear printed sheet 5501, a rear protective sheet 5701, and a magnetic stripe 6001. Then, the fabricated components are sequentially stacked and laminated. Next, the IC module for a card 5001 is connected to contact points of the antenna terminals of the antenna inlay sheet, and the chip is embedded by applying heat and pressure. Through the above processes, the fabrication of the metal card can be completed. The detailed descriptions of each manufacturing step are the same as those of the method for manufacturing the metal card according to the second embodiment described above.

Fourth Embodiment

Hereinafter, the metal card having a glass body according to the fourth embodiment of the present invention will be described in detail. The metal card according to the fourth embodiment of the present invention includes a frame metal body, a first glass body, a second glass body, and an antenna module.

The frame metal body is made of a metal plate having a predetermined size and thickness of a card. The frame metal body includes a first insertion space on an upper surface thereof and a second insertion space on a lower surface thereof positioned in the opposite side of the upper surface.

The first glass body is formed of a sheet made of a glass material and has a size configured to be insertable into the first insertion space of the frame metal body. The first glass body is disposed in the first insertion space. The second glass body is also formed of a sheet made of a glass material and has a size configured to be insertable into the second insertion space of the frame metal body. The second glass body is disposed in the second insertion space. The antenna module includes a substrate and an antenna provided on a surface of the substrate.

The antenna module is mounted in an antenna insertion space provided in one of the first and second insertion spaces of the frame metal body.

Fifth Embodiment

Figure 30A:
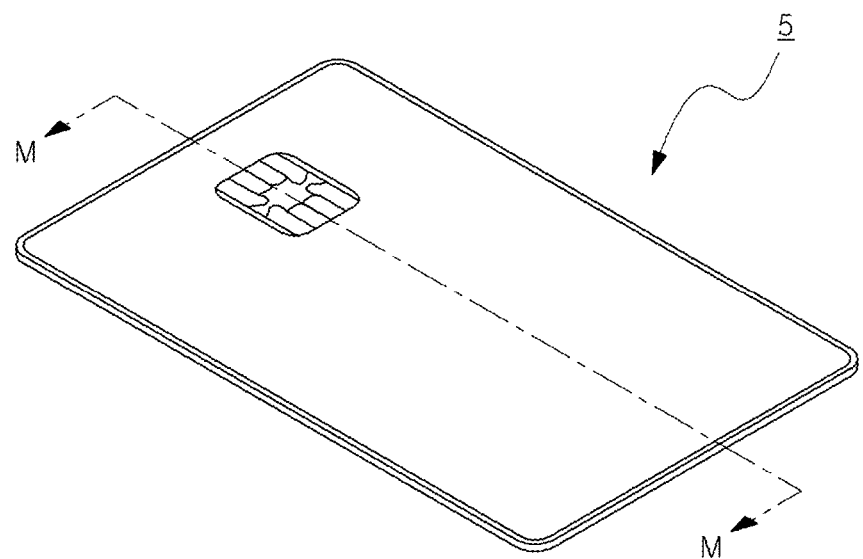
FIGS. 30A and 30B are a perspective view and a cross-sectional view taken along line M-M, respectively, of the metal card having a glass body according to the fifth embodiment of the present invention.
Figure 30B:
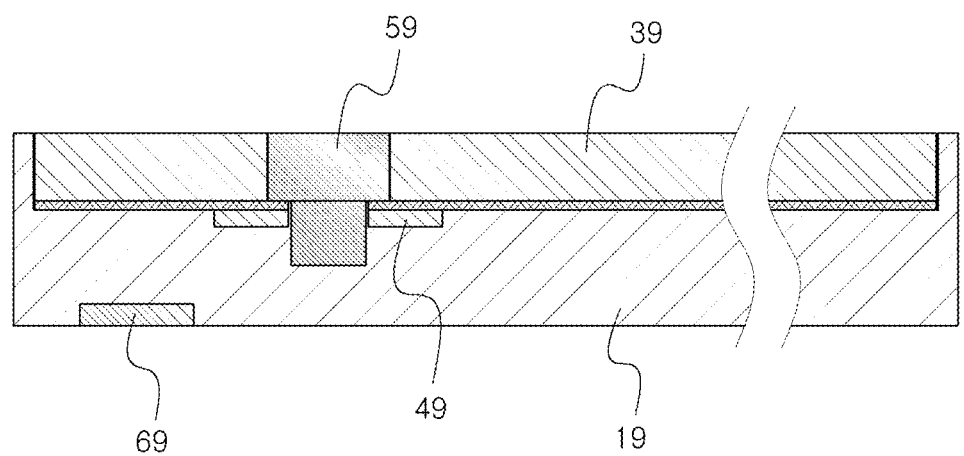

Hereinafter, the metal card having a glass body according to the fifth embodiment of the present invention will be described in detail with reference to the accompanying drawings. FIGS. 30A and 30B are a perspective view and a cross-sectional view, respectively, of a metal card having a glass body according to the fifth embodiment of the present invention.

The metal card 5 according to the fifth embodiment of the present invention includes a frame metal body 19, a glass body 39, an antenna module 49, and a magnetic stripe 69. The metal card according to the present embodiment may further include an IC module for a card 59. The frame metal body 19 is made of a metal plate having a predetermined size of a card. The frame metal body 19 includes a glass body insertion space and an antenna insertion space on a first surface, and an insertion space for a magnetic stripe (MS) on a second surface opposite to the first surface.

The glass body 39 is formed of a sheet made of a glass material and has a size configured to be insertable into the glass body insertion space. The glass body 39 is disposed in the glass body insertion space. The antenna module 49 includes a substrate and an antenna mounted on a surface of the substrate and is disposed in the antenna insertion space of the frame metal body. The magnetic stripe 69 is disposed in the insertion space for a MS of the frame metal body.

The metal cards having the above-described configuration according to the present invention may be used as credit cards, membership cards, identification cards, transportation cards, and the like.

While the present invention has been described above with reference to preferred embodiments, these are merely exemplary and are not intended to limit the scope of the invention. It will be understood by those skilled in the art that various modifications and applications not specifically described herein may be made without departing from the essential spirit and scope of the present invention. Differences relating to such modifications and applications should be construed as being included within the scope of the invention as defined in the appended claims.

What is claimed is:

1. A metal card having a glass body, comprising:
    a frame metal body formed of a metal plate having a predetermined size and thickness of a card, the frame metal body including a first insertion space on a first surface and a second insertion space on a second surface on the opposite side of the first surface;
    a glass body formed of a sheet made of glass material and having a size configured to be insertable into the first insertion space of the frame metal body;
    a rear metal body formed of a metal sheet and having a size configured to be insertable into the second insertion space of the frame metal body, the rear metal body including an antenna insertion space; and
    an antenna module having an antenna on a surface of a substrate, the antenna module being mounted in the antenna insertion space of the rear metal body.

2. The metal card having a glass body according to claim 1, further comprising a printed layer disposed between the glass body and the frame metal body.

3. The metal card having a glass body according to claim 2, further comprising:
    a UV 3D pattern layer formed by a three-dimensional pattern composed of a UV-curable material on a surface of the printed layer;
    a deposition layer formed as a multilayer structure by sequentially depositing different materials on a surface of the UV 3D pattern layer; and
    a light-blocking layer formed by applying a light-shielding material on a surface of the deposition layer to block light transmission,
    wherein the metal card provides a three-dimensional pattern.

4. The metal card having a glass body according to claim 3, wherein the deposition layer is configured such that types, stacking order, and stacking thickness of deposition materials are determined according to a required color tone or degree of reflectivity of the three-dimensional pattern for the metal card.

5. The metal card having a glass body according to claim 1, further comprising a shatterproof film made of a transparent adhesive film and disposed on a rear surface of the glass body,
    wherein the shatterproof film is configured to prevent breakage of the glass body and scattering of fragments of the glass body.

6. The metal card having a glass body according to claim 1, further comprising an IC module for a card, the IC module having contact points electrically connected to contact points of the antenna,
    wherein the frame metal body includes a first chip insertion hole in its main body, the glass body includes a second chip insertion hole at a position corresponding to the first chip insertion hole, the rear metal body includes a third chip insertion hole at a position corresponding to the first chip insertion hole, and the IC module for a card is mounted in the first, second, and third chip insertion holes.

7. The metal card having a glass body according to claim 6, wherein the frame metal body includes a first slit formed by cutting between an edge of the main body of the frame metal body and an edge of the first chip insertion hole, and
    the rear metal body includes a second slit formed by cutting between an edge of the main body of the rear metal body and an edge of the third chip insertion hole.

8. A metal card having a glass body, comprising:
    a frame metal body formed of a metal plate having a predetermined size and thickness of a card, the frame metal body including a first insertion space on a first surface and a second insertion space on a second surface on the opposite side of the first surface;

a first glass body formed of a sheet made of glass material and having a size configured to be insertable into the first insertion space of the frame metal body;

a second glass body formed of a sheet made of glass material and having a size configured to be insertable into the second insertion space of the frame metal body; and an antenna module having an antenna on a surface of a substrate, the antenna module being mounted in an antenna insertion space provided in one of the first and second insertion spaces of the frame metal body.

9. A method of manufacturing a metal card having a glass body, comprising the steps of:
   (a) fabricating a glass body formed of a sheet made of glass material;
   (b) fabricating a frame metal body having a first insertion space on a first surface and a second insertion space on a second surface on the opposite side of the first surface;
   (c) fabricating a rear metal body having an antenna insertion space;
   (d) fabricating an antenna module; and
   (e) assembling the glass body into the first insertion space of the frame metal body, assembling the antenna module and the rear metal body into the second insertion space, and laminating the assembled components.

10. The method of manufacturing a metal card having a glass body according to claim 9, wherein the step (a) comprises:
   (a1) fabricating a sheet made of glass material by processing a glass plate to a size configured to be insertable into the first insertion space of the frame metal body and forming a second chip insertion hole in the glass sheet to complete the glass body; and
   (a2) forming a printed layer on a rear surface of the glass body.

11. The method of manufacturing a metal card having a glass body according to claim 10, wherein the step (a) further comprises:
   (a3) forming a UV 3D pattern layer by forming a three-dimensional pattern made of a UV-curable material on a surface of the printed layer;
   (a4) forming a deposition layer having a multilayer structure by sequentially depositing different materials on a surface of the UV 3D pattern layer; and
   (a5) forming a light-blocking layer by applying a light-shielding material on a surface of the deposition layer to block light transmission.

12. The method of manufacturing a metal card having a glass body according to claim 9, further comprising a step of applying a transparent adhesive material having a shatterproof function to a rear surface of the glass body to form a shatterproof film,
   wherein the shatterproof film is configured to prevent breakage of the glass body and to prevent scattering of fragments of the glass body.

13. The method of manufacturing a metal card having a glass body according to claim 12, wherein the step (b) further comprises forming a first slit by cutting between an edge of the main body of the frame metal body and an edge of the first chip insertion hole,
   and the step (c) further comprises forming a second slit by cutting between an edge of the main body of the rear metal body and an edge of the third chip insertion hole.

14. The method of manufacturing a metal card having a glass body according to claim 9, further comprising: (f) electrically connecting the antenna module and an IC module for a card in the laminated result and embedding the IC module in the metal card by pressure,
   wherein the frame metal body includes a first chip insertion hole in its main body, the glass body includes a second chip insertion hole at a position corresponding to the first chip insertion hole, the rear metal body includes a third chip insertion hole at a position corresponding to the first chip insertion hole, and the IC module for a card is mounted in the first, second, and third chip insertion holes and embedded therein.

\* \* \* \* \*